Jan. 19, 1937.  W. E. BOWERSOCK ET AL  2,068,163
METHOD OF AND APPARATUS FOR MAKING CONTAINERS
Filed Dec. 5, 1935  15 Sheets-Sheet 1

INVENTORS
Wilber E. Bowersock
Francis J. Spiess
BY Edward H. Cumpston
their ATTORNEY

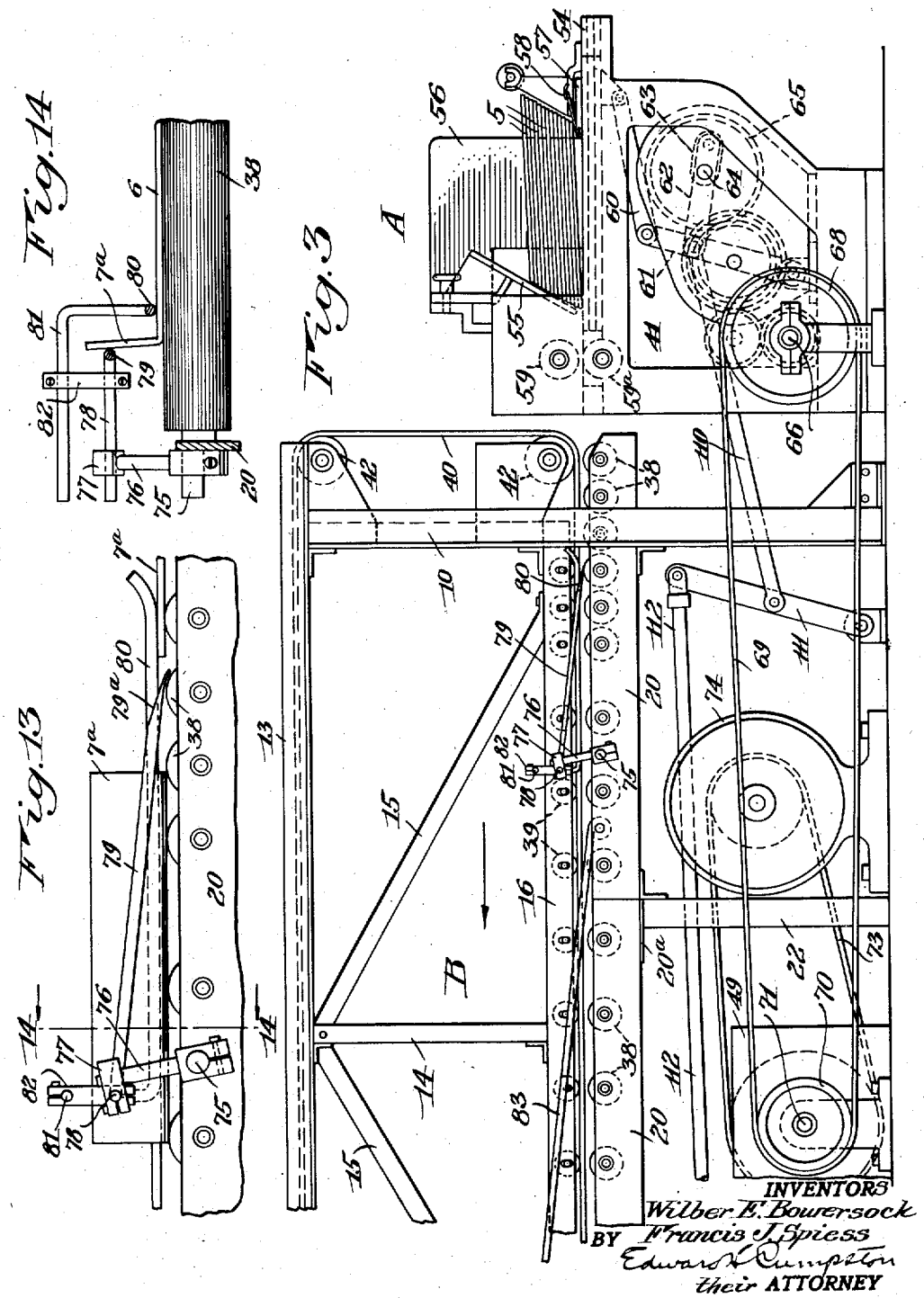

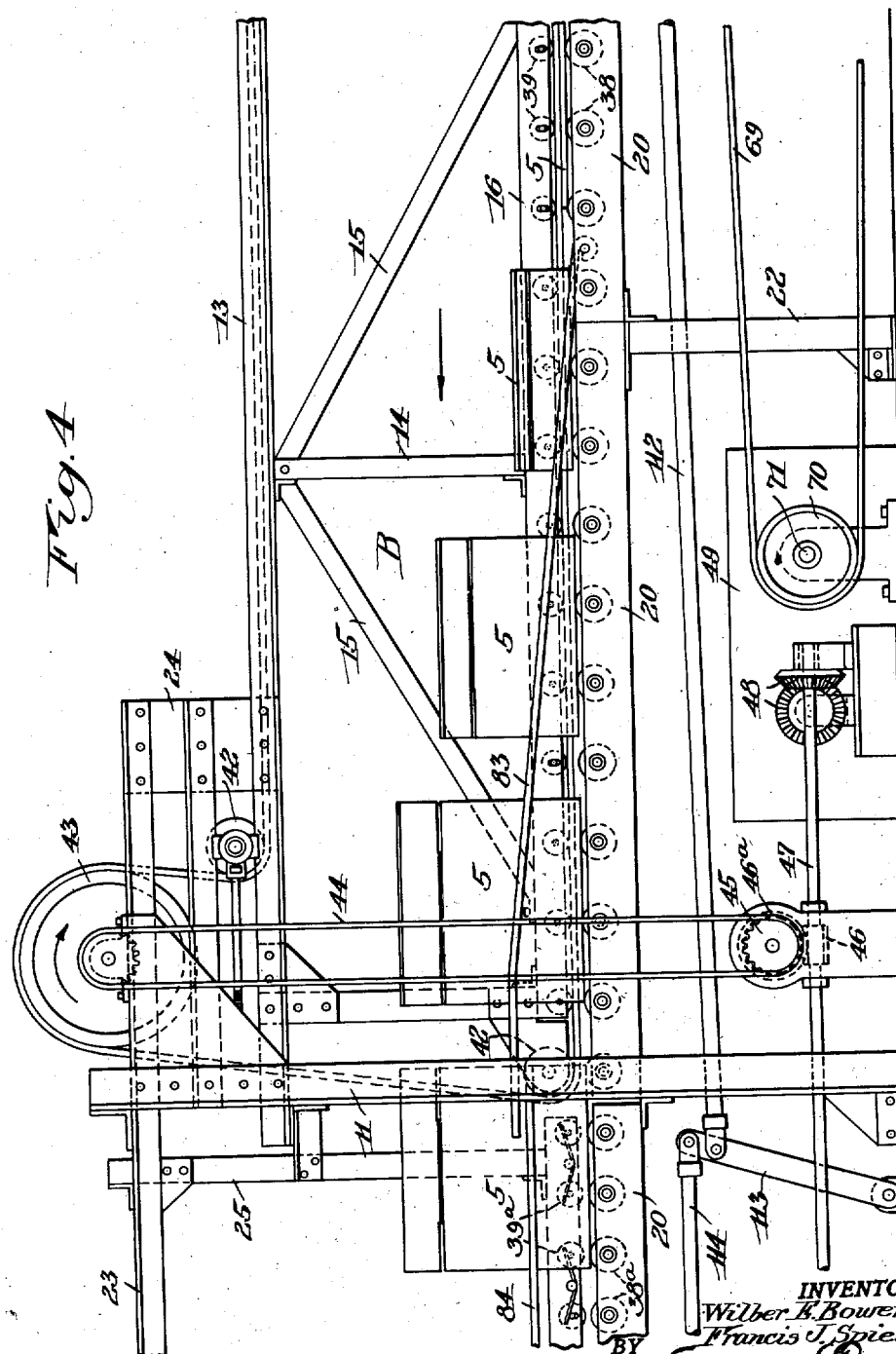

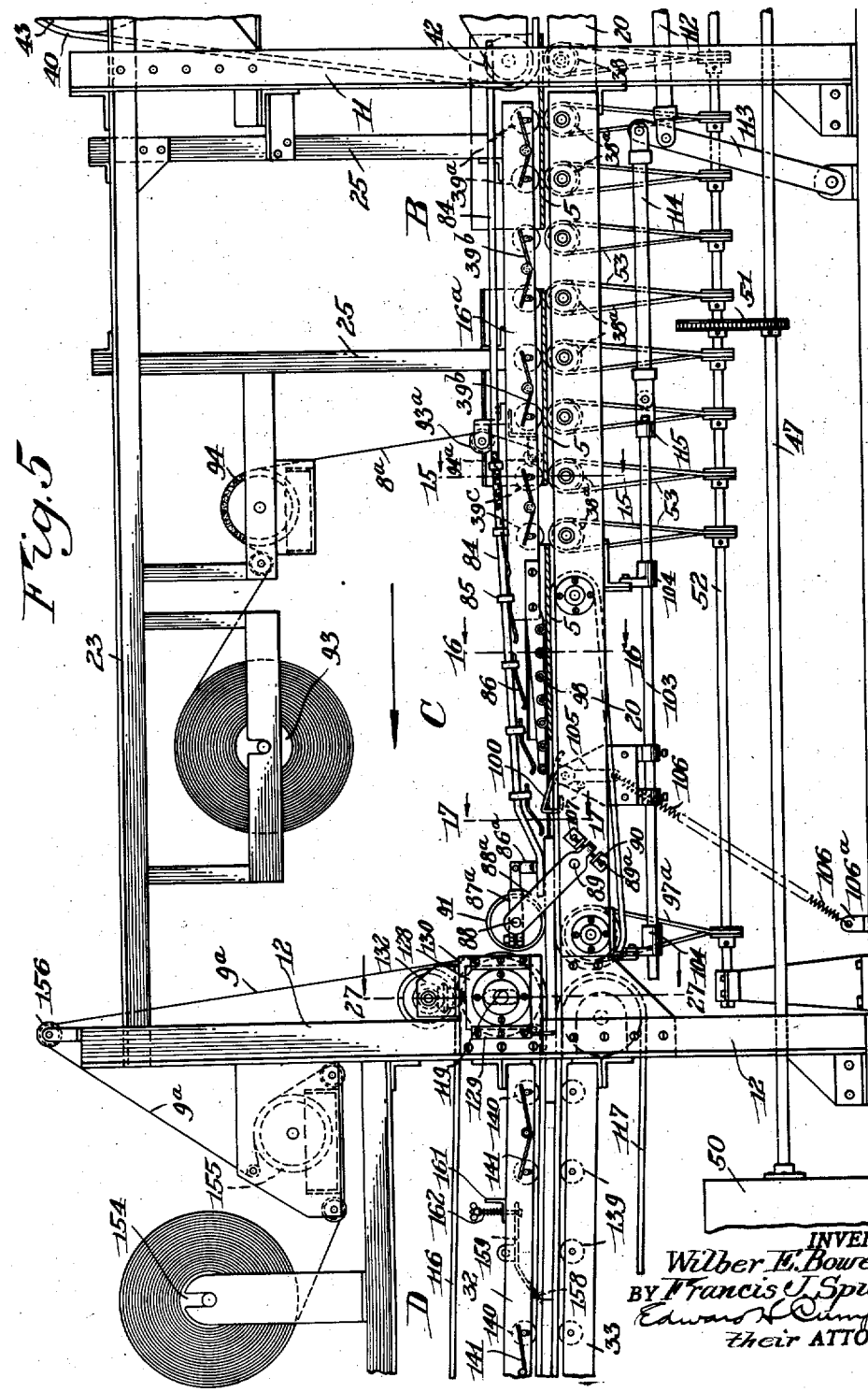

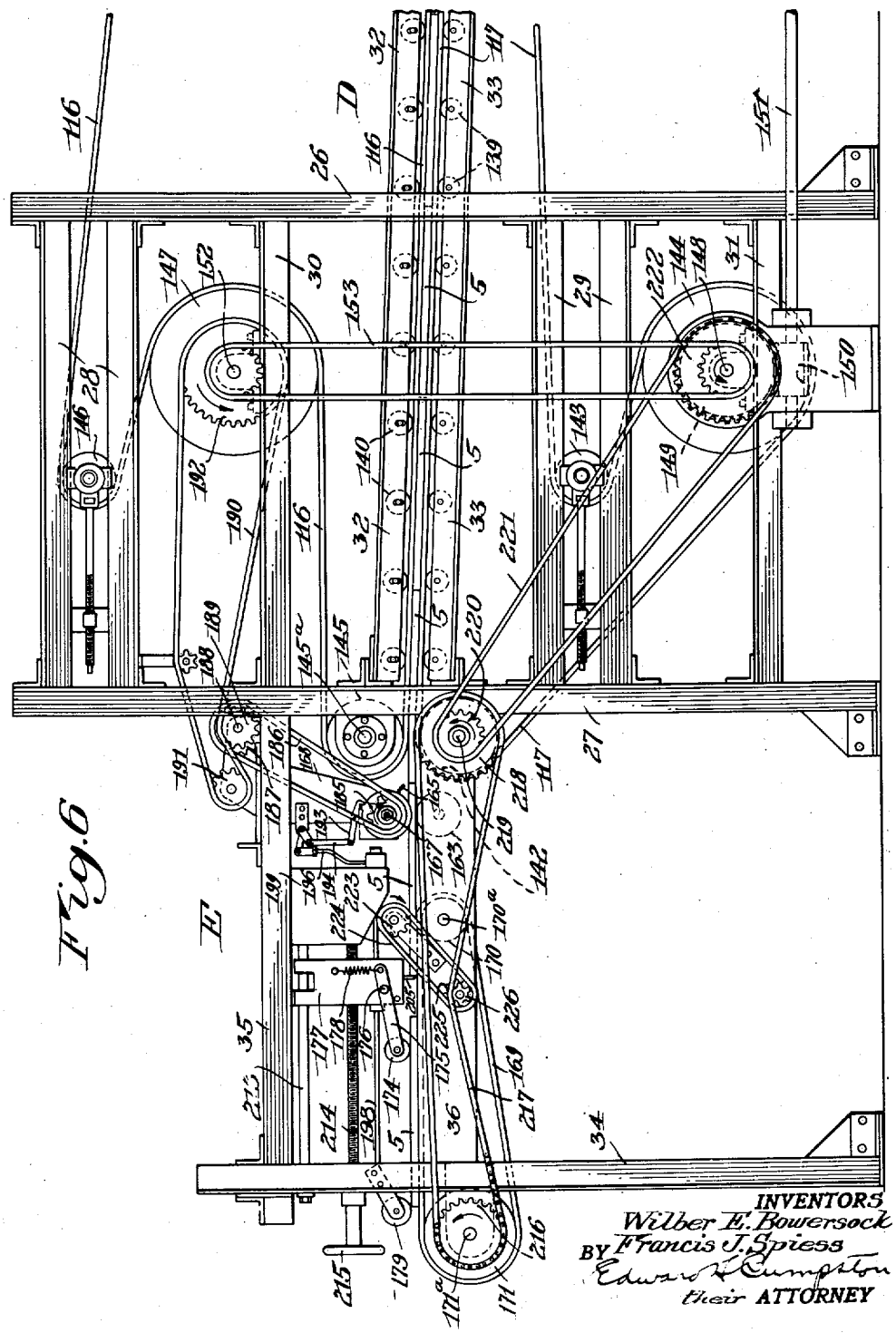

Jan. 19, 1937. W. E. BOWERSOCK ET AL 2,068,163
METHOD OF AND APPARATUS FOR MAKING CONTAINERS
Filed Dec. 5, 1935 15 Sheets-Sheet 6
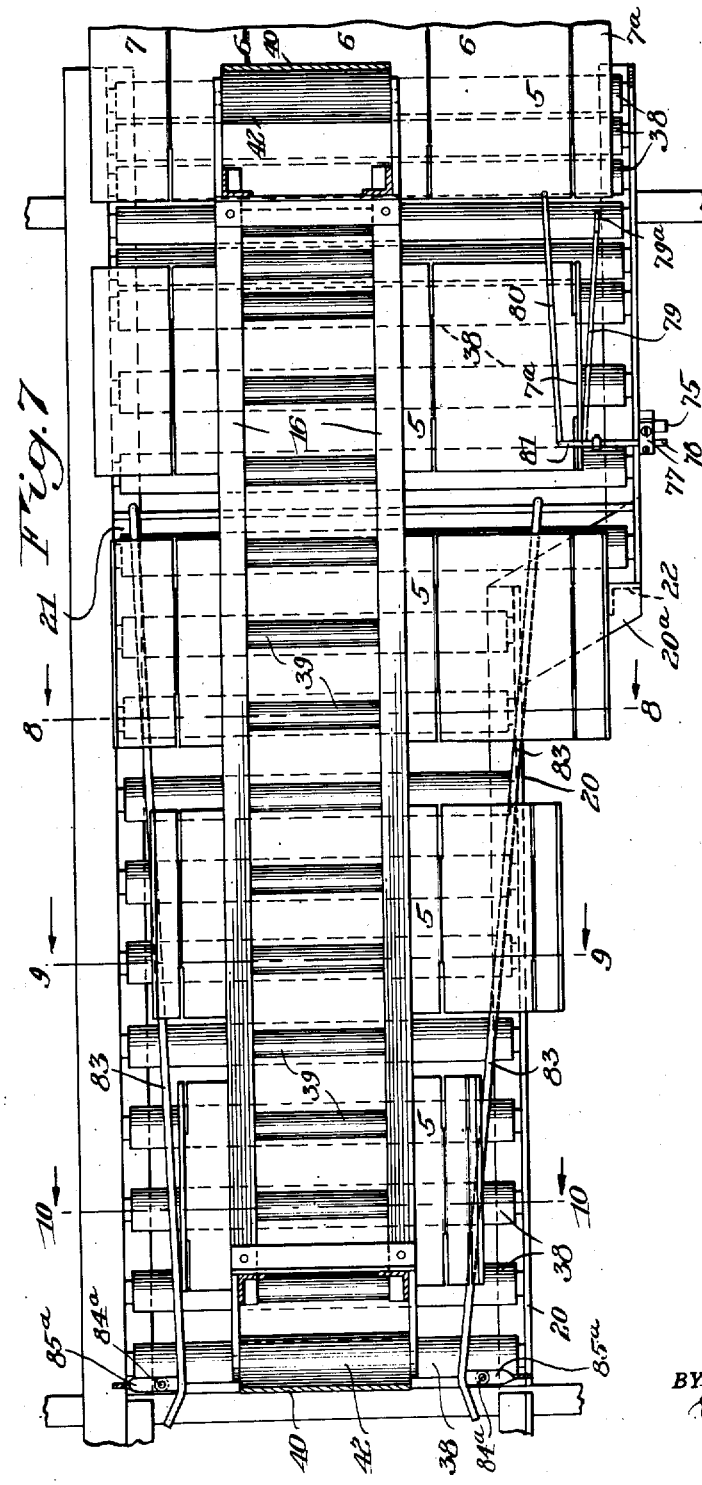
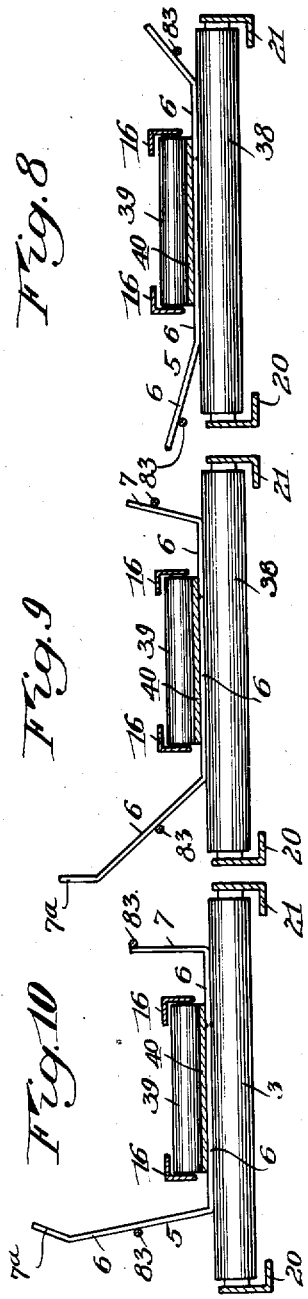
INVENTORS
Wilber E. Bowersock
BY Francis J. Spiess
Edward L. Cumpston
their ATTORNEY

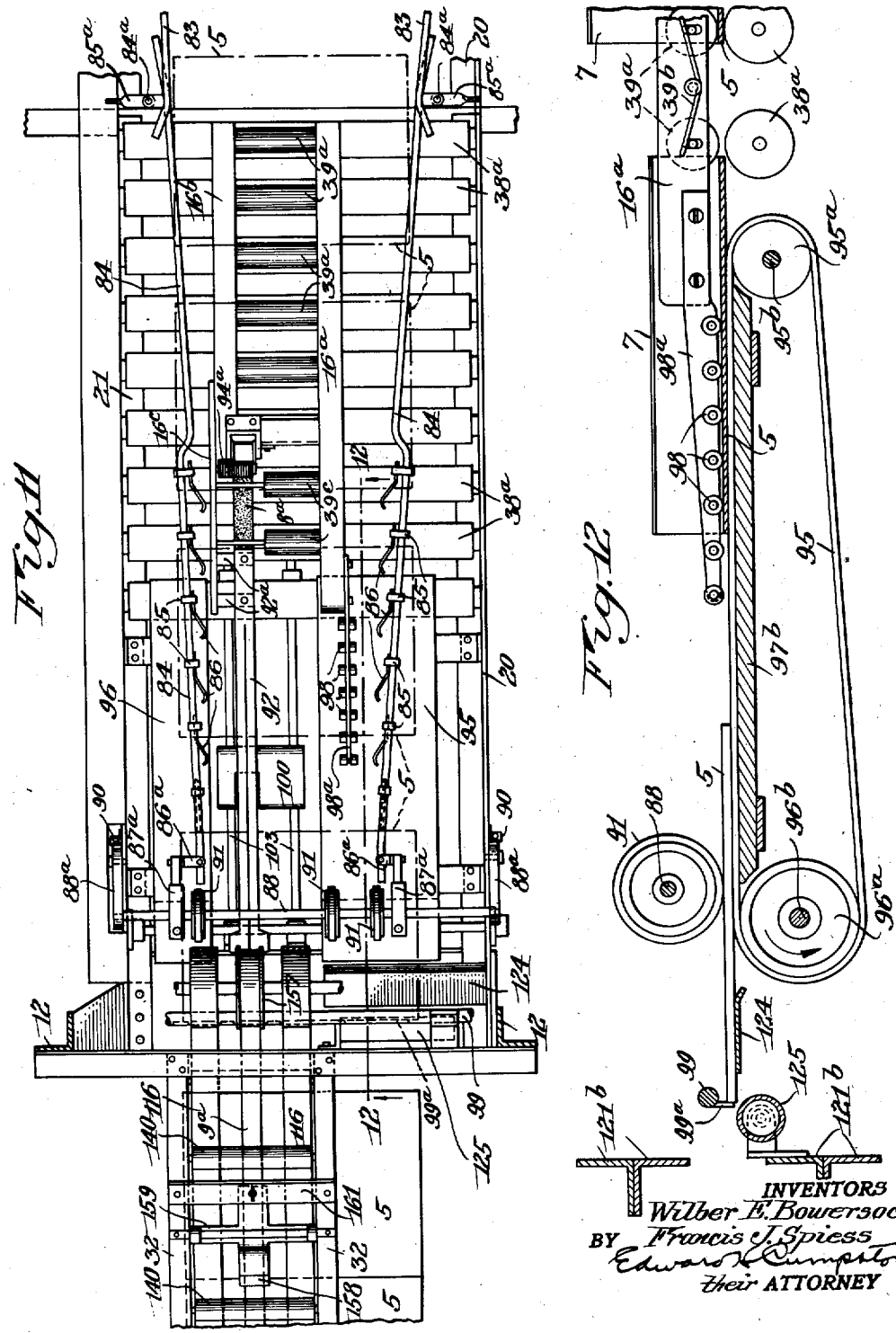

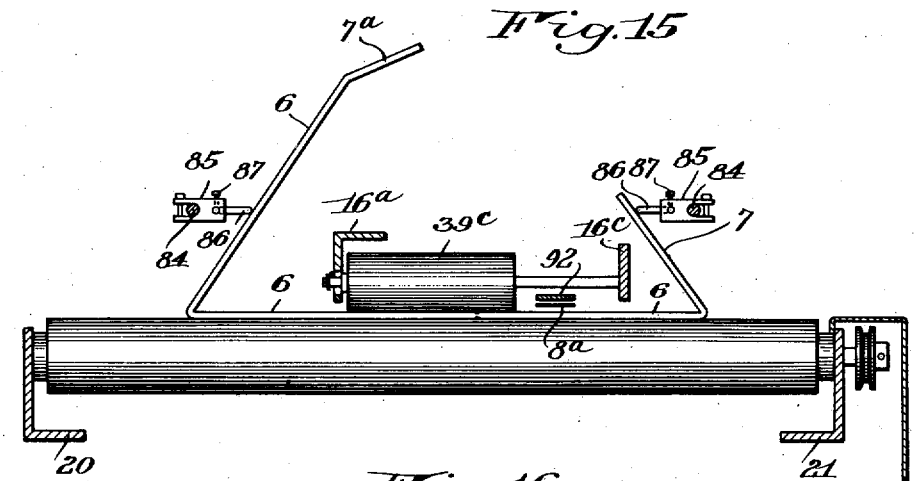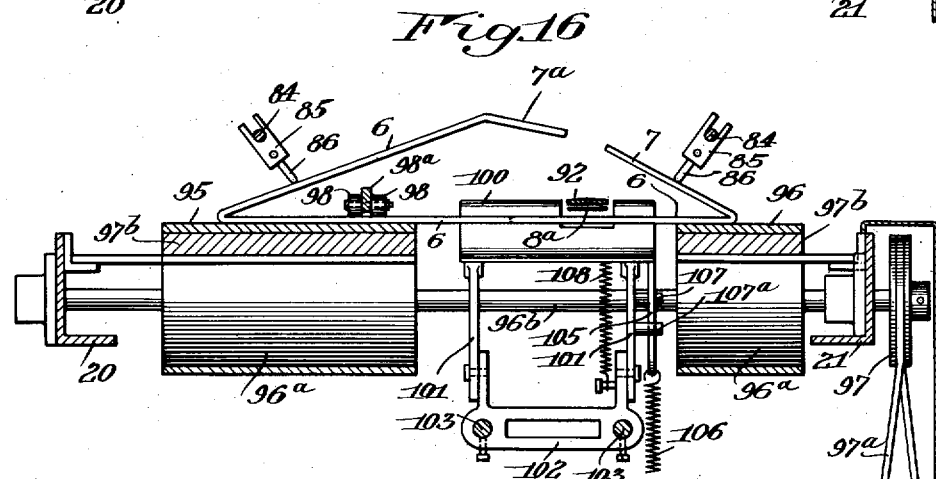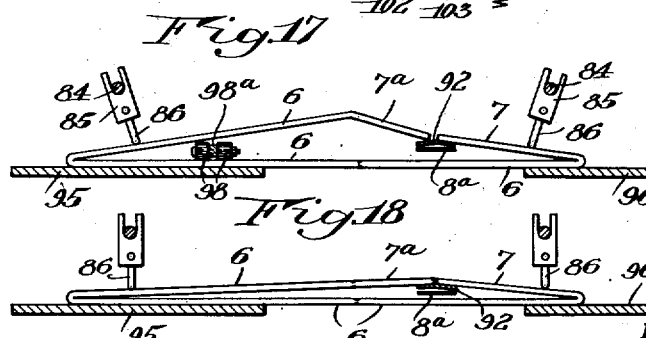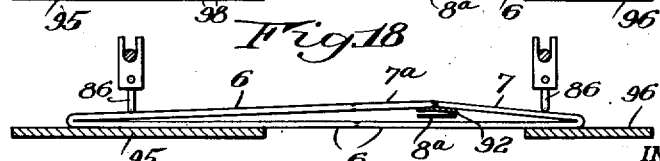

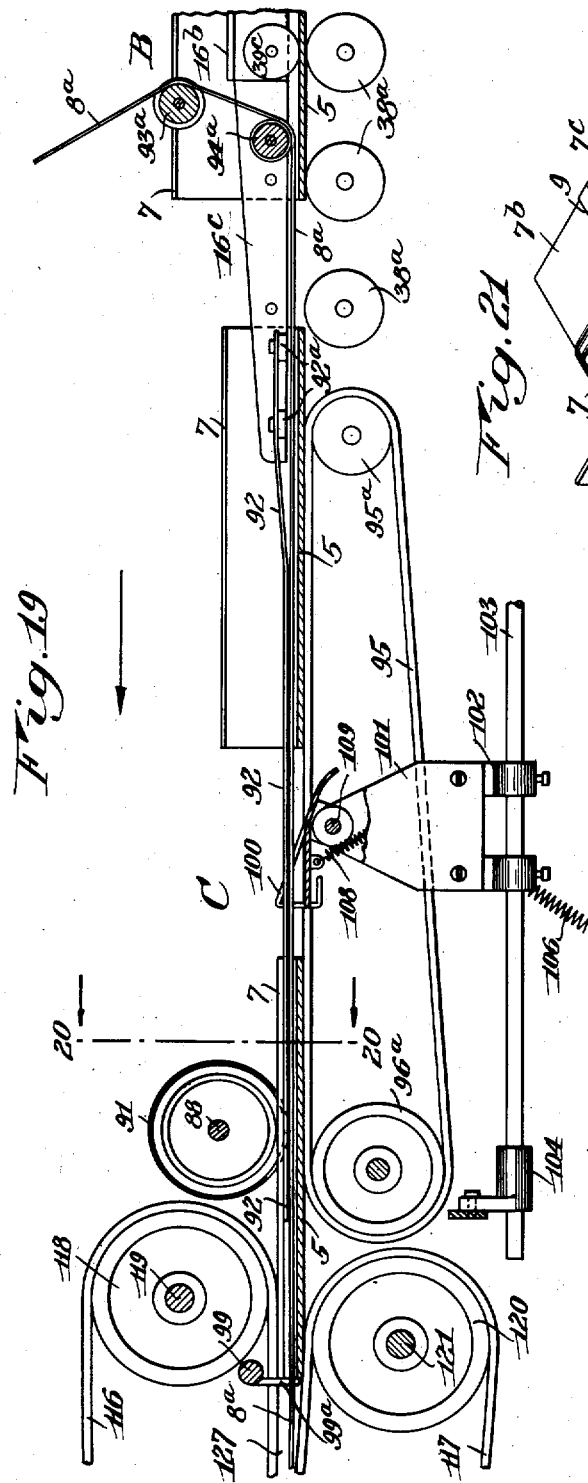

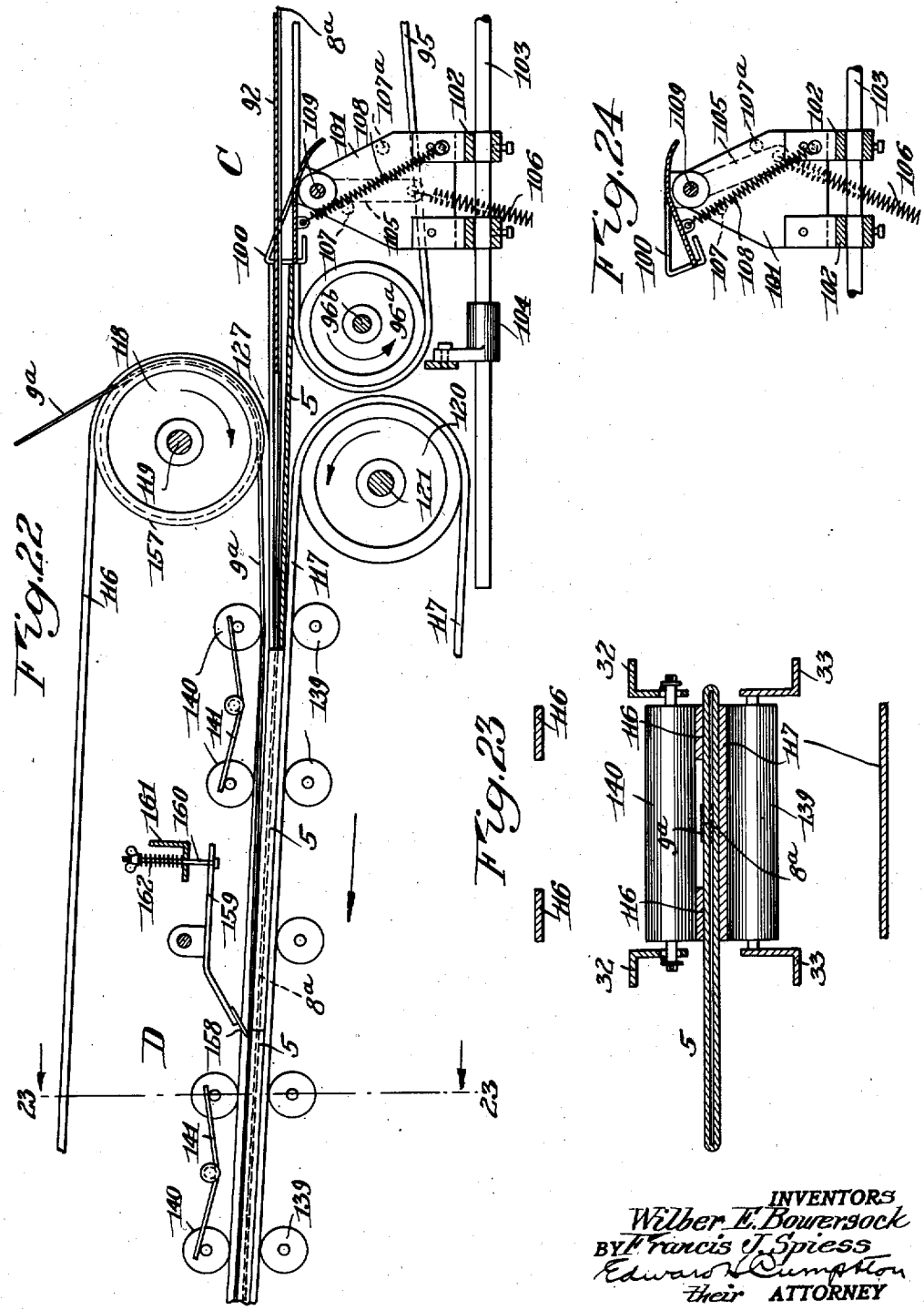

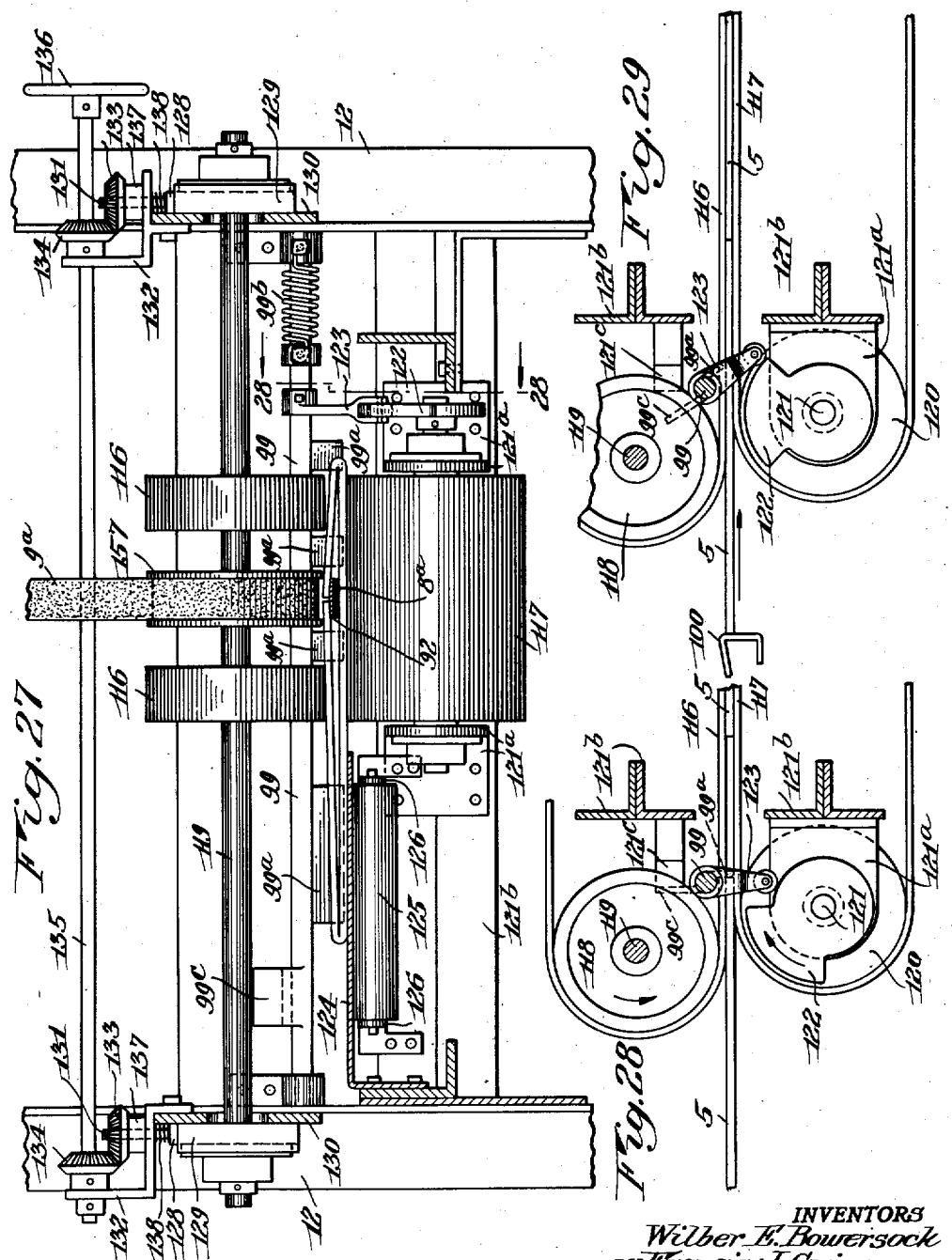

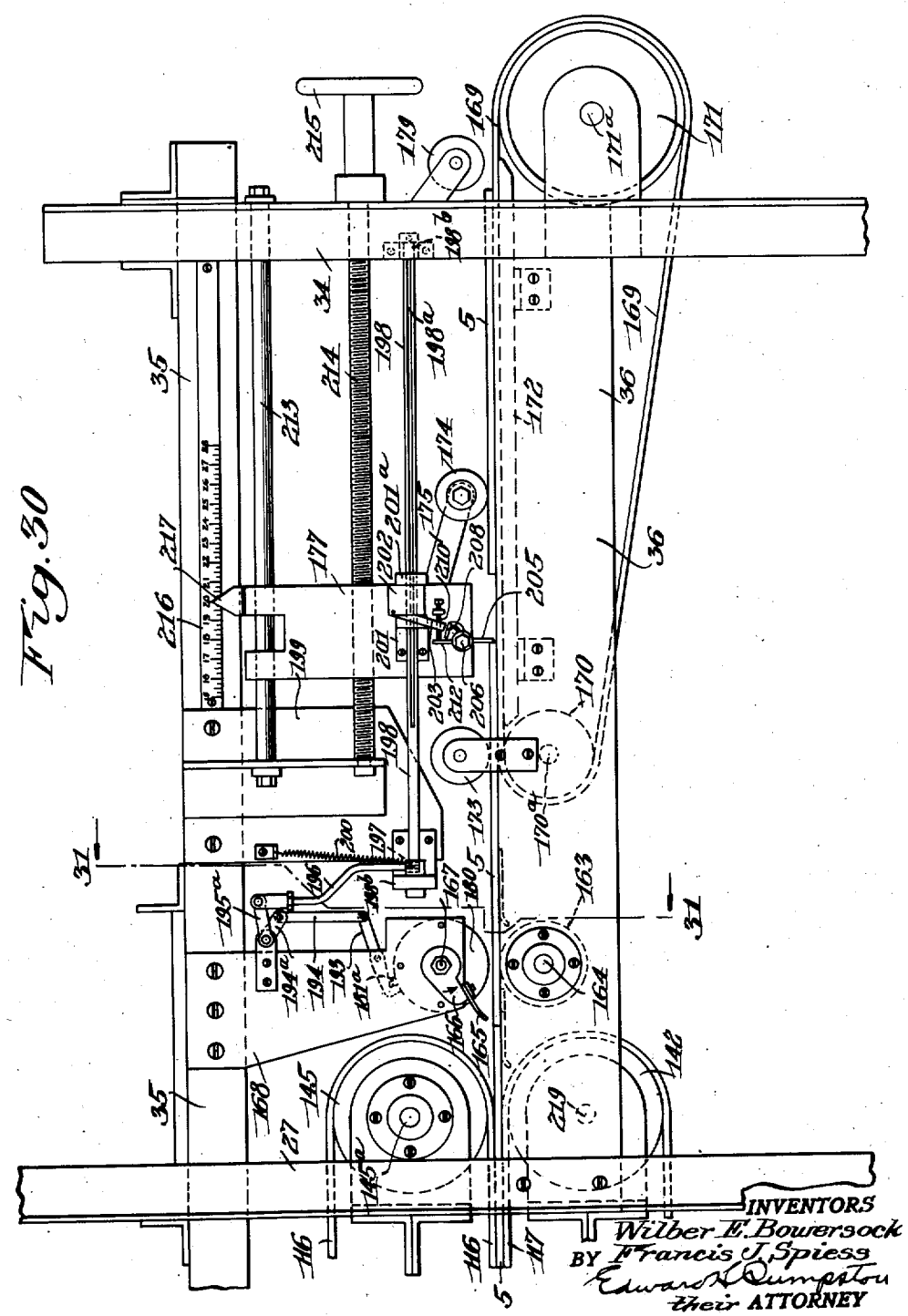

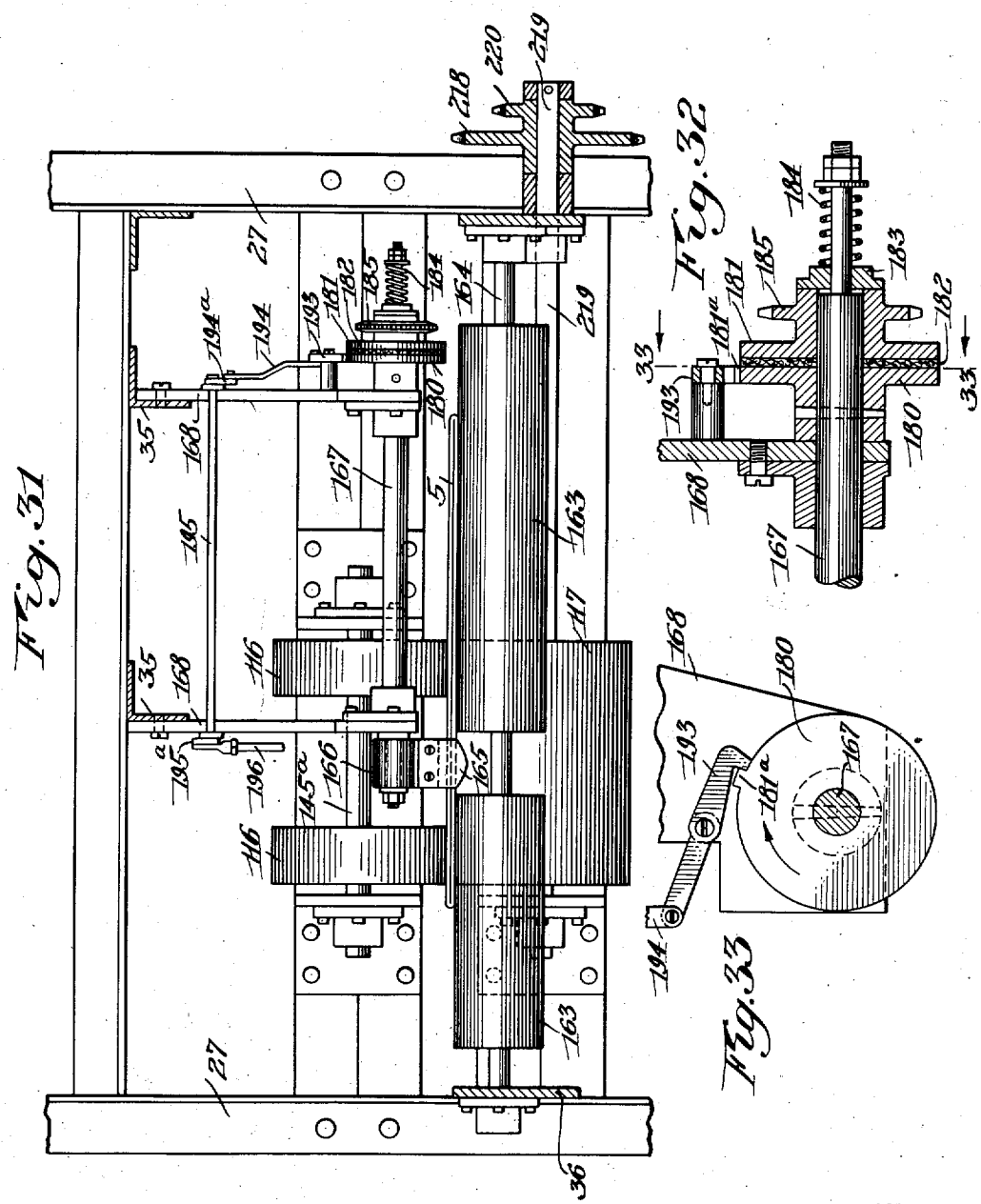

Jan. 19, 1937. W. E. BOWERSOCK ET AL 2,068,163
METHOD OF AND APPARATUS FOR MAKING CONTAINERS
Filed Dec. 5, 1935 15 Sheets-Sheet 15
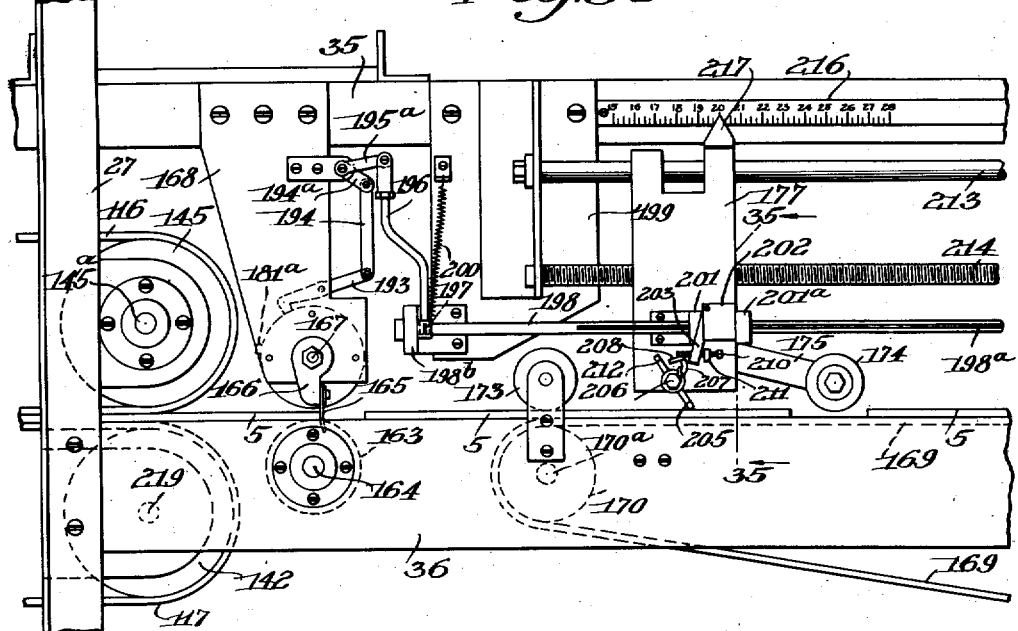
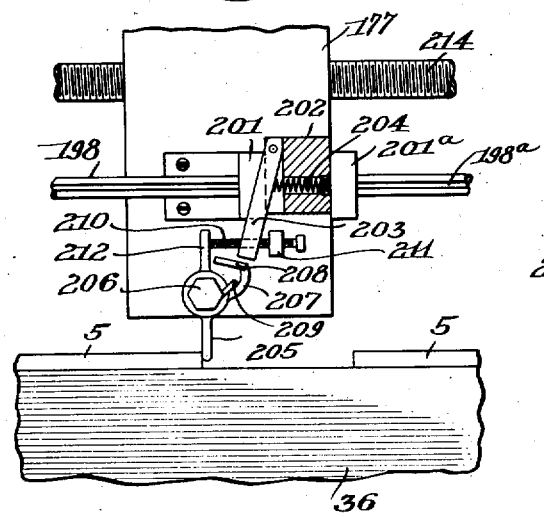
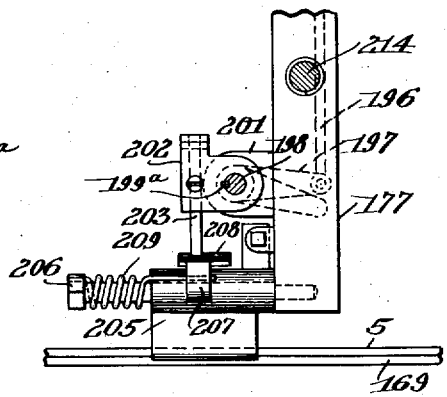
INVENTORS
Wilber E. Bowersock
Francis J. Spiess
BY Edward H. Cumpston
their ATTORNEY Patented Jan. 19, 1937

2,068,163

UNITED STATES PATENT OFFICE 2,068,163

METHOD OF AND APPARATUS FOR MAKING CONTAINERS

Wilber E. Bowersock and Francis J. Spiess, Rochester, N. Y., assignors to The Rochester Folding Box Co., Rochester, N. Y., a corporation of New York Application December 5, 1935, Serial No. 53,024

79 Claims. (Cl. 93—41)

The invention relates to an improved method of and apparatus for making containers or boxes from sheet material such, for example, as corrugated or other fiber boards or blanks.

One object of the invention is to provide an improved machine for producing paper or cardboard boxes or containers by a rapid and continuous method whereby to increase the output of machines of this type, and to materially lower the cost of production of the articles.

A further object of the invention is to provide improved means for advancing, folding and operating upon the folded sections of the blanks to position their opposing edges in adjacent and substantially parallel relation preparatory to uniting said edges by the use of suitable connecting means.

Another object of the invention is to provide improved means for offsetting one or more of the foldable portions of the blanks to avoid overlapping of said portions when folding them down over an intermediate portion of the blank to position their opposing edges in adjacent or abutting relation.

A further object of the invention is to provide improved means for folding the blanks which will permit them to be advanced with a minimum degree of frictional resistance and which will insure a gradual downward and unhurried movement of the foldable sections into position upon means provided for receiving opposite edge portions of the sections.

A further object of the invention is to provide improved means for truing or squaring the folded sections of the blanks to insure proper alinement thereof and the positioning of their opposing edges in substantially abutting relation for the proper reception of the connecting means therefor, such, for example, as gummed strips or tapes.

A further object of the invention is to provide improved coordinated mechanisms for advancing and truing the folded blanks and for continuing their advancement and at the same time moving each into engagement with the next preceding blank.

Another object of the invention is to provide improved means for applying the tapes or securing strips to the adjacent edges of the folded sections of the blanks.

A further object of the invention is to provide improved automatic severing means for the tapes, the operations of which are controlled by the advancing blanks.

A further object of the invention is to provide improved coordinated and properly timed mechanisms for feeding and advancing the blanks in spaced relation, folding and truing the same, taping the blanks during advancement, and severing the tape at points between the blanks while continuing their advancement, whereby to provide a continuous and automatic method of operation by which to rapidly, economically, and efficiently produce the desired articles.

A further object of the invention is to provide an improved method of conditioning and operating upon the blanks to prevent overlapping of the opposing edges of the end portions thereof when folding the blanks to position said edges in substantially abutting relation.

A further object of the invention is to provide an improved method of conditioning, folding and operating upon the folded sections of the blanks in a manner to position opposing edges of the sections in adjacent and substantially parallel relation.

To these and other ends the invention resides in certain improvements and combinations of parts, all as will be hereinafter more fully described, the novel features being pointed out in the claims at the end of the specification.

In the drawings:

Fig. 1 is a side elevation diagrammatically illustrating various parts of a machine embodying the invention;

Fig. 2 is a diagrammatic plan view of the machine shown in Fig. 1;

Figs. 3, 4, 5, and 6 are views in elevation which, taken together, form a complete side elevation of the machine;

Fig. 7 is a fragmentary sectional plan of the blank advancing and folding portion of the machine to which the blanks are discharged by the feeding mechanism;

Figs. 8, 9, and 10 are transverse sections taken respectively on the lines 8—8, 9—9, and 10—10 of Fig. 7;

Fig. 11 is a sectional plan of that portion of the machine which forms a continuation of that shown in Fig. 7 and which completes the blank folding and truing operations;

Fig. 12 is a longitudinal section taken substantially on line 12—12 of Fig. 11;

Fig. 13 is a fragmentary side elevation drawn to an enlarged scale and illustrating the means shown in Figs. 3 and 7 for offsetting one of the scored portions of each blank during advancement of the blanks;

Fig. 14 is a transverse section on line 14—14 of Fig. 13;

Figs. 15, 16, and 17 are transverse sections taken respectively on lines 15—15, 16—16, and 17—17 of Fig. 5, and illustrating the method of folding the blanks during advancement thereof;

Fig. 18 is a transverse section similar to Fig. 17 showing the folded portions of the blanks in the lowest position to which they are moved by the folding means;

Fig. 19 is a fragmentary sectional elevation taken longitudinally through that portion of the machine embodying means for squaring or truing the blanks and showing said means in the position it occupies at the beginning of its stroke;

Fig. 20 is a transverse section on line 20—20 of Fig. 19 showing the rollers for holding the folded portions of the blanks down upon the horn which prevents said portions from contacting with the inner advancing tape;

Fig. 21 is a perspective view of the container with the flaps shown in open position;

Fig. 22 is a longitudinal fragmentary sectional elevation somewhat similar to Fig. 19 and showing the blank squaring means at the end of its operating stroke, at which it has moved the blank into engagement with the next preceding blank in advance thereof.

Figure 25:
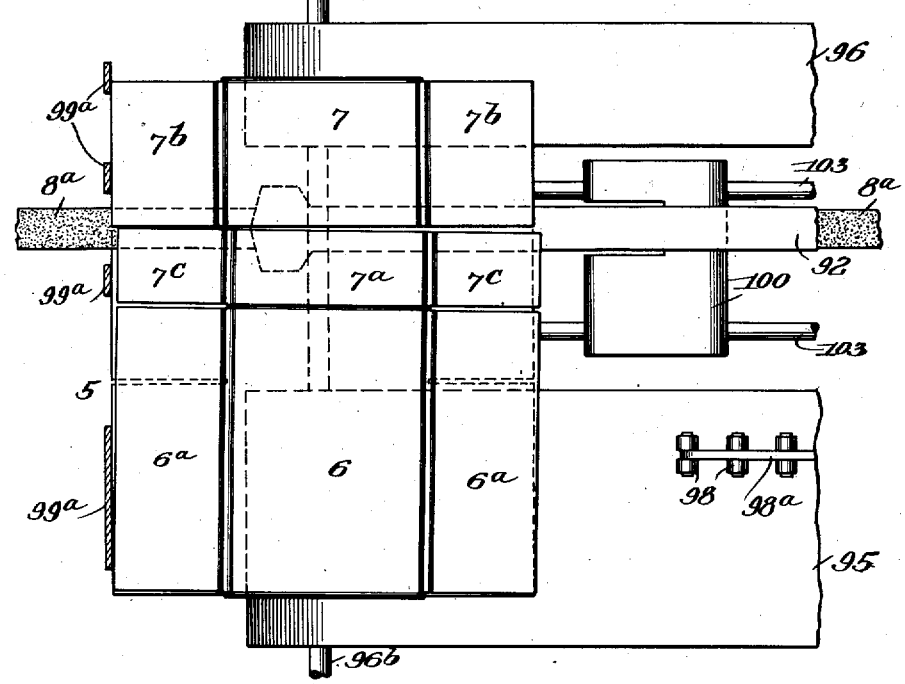
Figure 26:
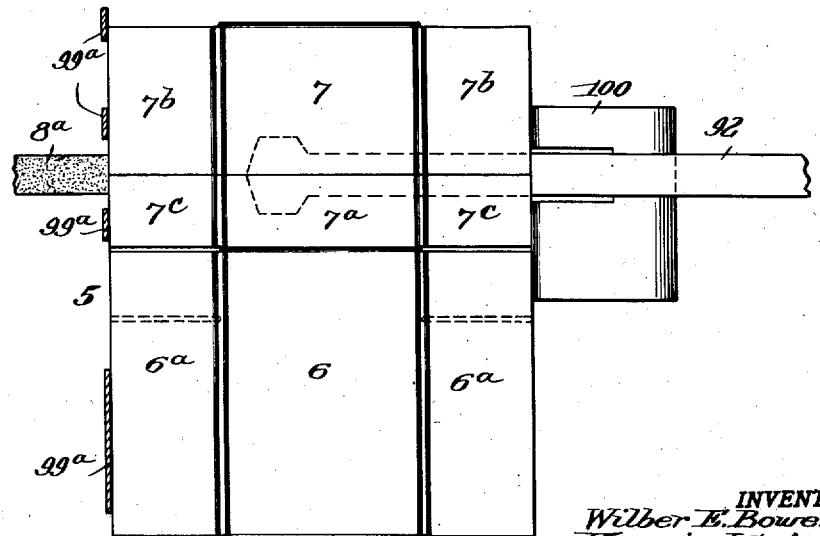

Fig. 23 is a transverse sectional elevation taken on line 23—23 of Fig. 22;

Fig. 24 is a sectional elevation taken longitudinally through the blank truing means and showing the blank squaring element in the lowered position to which it is moved upon completion of its operating stroke;

Fig. 25 is a plan view of a blank showing the folded sections out of alinement and illustrating a portion of the means for truing or squaring the blanks;

Fig. 26 is a similar view showing the sections moved into alinement with their opposing edges in parallel relation;

Fig. 27 is a transverse sectional elevation taken on line 27—27 of Fig. 5 showing the means for adjusting the shaft carrying the upper feed belt pulleys to vary the opening between the upper and lower feed belts shown in Fig. 22;

Fig. 28 is a fragmentary sectional elevation on line 28—28 of Fig. 27 illustrating the cam-controlled means for arresting the blank when it is moved to the truing position shown in Fig. 26;

Fig. 29 is a similar view showing the arresting means moved to blank releasing position;

Fig. 30 is a fragmentary side elevation illustrating the tape severing mechanism and the parts for controlling the operation of the same;

Fig. 31 is a transverse sectional elevation on line 31—31 of Fig. 30;

Fig. 32 is a longitudinal section through the clutch for operating the tape severing means;

Fig. 33 is a transverse section taken on line 33—33 of Fig. 32;

Fig. 34 is a view similar to Fig. 30 showing the tape severing mechanism in operating position and the tripping means therefor released by the blank;

Fig. 35 is a fragmentary sectional elevation on the line 35—35 of Fig. 34 illustrating the construction of the clutch tripping mechanism, and Fig. 36 is a fragmentary sectional elevation of the tripping mechanism as viewed from the left of Fig. 35.

The same reference numerals throughout the several views indicate the same parts.

The present machine generally embodies means for feeding the blanks in spaced relation to a blank advancing mechanism, which includes means for increasing their speed after they have traveled a predetermined distance and which operates to successively move the blanks into engagement with means for momentarily arresting the same, means also being provided for folding the blanks during advancement by said mechanism. A reciprocating element is moved into engagement with the trailing edge of each arrested blank for cooperation with the arresting means to effect truing or squaring of the blank by properly alining the folded sections thereof one with another to position their adjacent edges in parallel relation. The arresting means is displaced immediately upon completion of the squaring operations and the reciprocating element then continues its operating stroke to move the trued blanks to a second advancing mechanism, preferably comprising upper and lower feed belts, between which the squared blanks are successively moved by said reciprocating element to a position at which each blank will overtake and engage the next preceding blank. Continued advancement of the blanks in contact one with another is afforded by the continuous operation of the feed belts.

The inner and outer gummed tapes are applied to the opposite sides of the adjacent or abutting edges of the folded sections of the blanks during advancement of the blanks by the feed belts, the tapes being unwound from the supply rolls by the pull exerted by the advancing blanks and made to contact with the blanks by suitable means for pressing the tapes into engagement with the blanks. The blanks are discharged by the feed belts to the tape severing mechanism, which includes a clutch driven knife operating to sever the inner and outer tapes at points between the advancing blanks, the clutch being released for operation by a trip mechanism including an element actuated by each successive blank discharged by the feed belts. Additional blank advancing means is provided for successively moving the blanks separated by the severing of the tapes, which means operates to increase the speed of the blanks to move them past the tripping element whereby to permit the latter to be returned to normal position in time to be engaged by the leading edge of each successive blank discharged by the feed belts.

The means for conditioning the blanks to avoid overlapping of the opposing edges of the foldable sections thereof is placed between the blank feeding means and the means for folding the blanks. The conditioning means operates during movement of the blanks by the advancing mechanism to bend an extension on one of the foldable sections of each blank upwardly and inwardly so that it will be offset relative to said section prior to the folding of the same. Subsequently when the folding sections are moved downwardly over the intermediate portion of the blank the opposing edges of said sections will lie in spaced relation when moved into contact with a horn or support provided for the reception of the same, after which means provided for the purpose will exert downward pressure on the section having the offset portion, causing its free edge to ride on the horn toward and substantially into abutting relation with respect to the opposing edge of the opposite section, thus avoiding any possibility of the overlapping of said edges.

Referring to the drawings, the box 4 shown in Fig. 21, which is constructed according to the method and by the apparatus described hereinafter, is preferably formed of a one piece blank, designated generally by the reference numeral 5.

the blank being formed of any suitable material such, for example, as corrugated or like composite board. The blanks may be cut to the desired size and shape and scored by suitable mechanism and, if preferred, the cutting, scoring, and feeding of the blanks to the advancing and folding means may be performed by a single machine of any well known design, although in the present disclosure the cutting and scoring mechanism has been omitted.

The blank from which the container shown in Fig. 21 is constructed has three side walls 6 which are provided with end closure flaps 6a, the fourth side wall being formed by uniting the relatively wide and narrow extensions 7 and 7a, respectively, having flap forming portions 7b and 7c thereon. The adjacent or meeting edge portions of the extensions, including those of the flap forming portions 7b, are united or joined together by the inner and outer connecting strips or tapes 8 and 9, as shown in Fig. 21, the strips being formed of any suitable material such, for example, as paper or cloth. The strips may be attached to the extensions or ends of the blank by any suitable means, but it is preferred to secure them by the use of adhesive material, which may be applied either to the opposite faces of the adjacent edge portions of the extensions or to the connecting strips before applying the latter to said edge portions, according to the method described hereinafter.

Referring to the diagrammatic arrangement shown in Figs. 1 and 2 of the drawings, the reference characters A, B, C, D, and E designate in a general way different sections of the machine for performing different operations. For example the section A is that for supporting and feeding the blanks in spaced relation to the section B which has means for successively advancing and folding the blanks, as well as means for offsetting a portion of one of the foldable ends of the blanks prior to the folding operations. The section C of the machine includes the blank arresting and truing means, and the means for increasing the speed of the blanks prior to the truing operations to compensate for the period of arrest and to insure greater clearance for operation of the movable element of the truing means. The section D is that through which the blanks are advanced in contact one with another and which has means for applying the inner and outer tapes to the adjacent edges of the folded ends of the blanks. The section E is that which embodies the tape severing mechanism and a conveyor for speeding up the blanks released by the severing operations to permit the tripping element for the knife controlling clutch to return to normal position in time to be operated by each blank advanced to the severing means.

The framework of the machine may be of any suitable design capable of supporting the various operating parts in proper cooperating relation. The framework of the sections B and C of the machine generally comprises the upright supporting members 10, 11, and 12 located at opposite sides of the machine and connected by suitable transverse tie members as best shown in Figs. 3, 4, and 5, and also by the upper longitudinally extending rails 13. The rails are supported intermediate their ends by the struts 14 and diagonal braces 15, the lower ends of said members being suitably connected with the longitudinally extending rails 16 which are suitably connected with the uprights 10 and 11 as shown in Figs. 3 and 4.

Disposed at opposite sides of the machine between the uprights 10, 11, and 12 and suitably connected therewith are the lower longitudinally extending rails or beams 20 and 21, the former comprising a plurality of connected sections, the outer section being offset relative to the inner sections and connected with one of the inner sections by a suitable tie plate 20a, Fig. 7. The lower side rails 20 and 21 are supported between their ends by a suitable number of uprights 22, Figs. 3 and 4.

The uprights 11 and 12 are also connected and braced by the longitudinally extending rails 23, the outer ends of which are connected with the rails 13 by means of the tie plates 24, Fig. 4.

In alinement with the rails 16 are additional roller supporting rails 16a and 16b, the latter being shorter than the former and having an arm 16c extending therefrom, Fig. 11, for a purpose which will appear hereinafter. The rails 16a and 16b are carried by the vertical supports 25, the lower ends of which are suitably connected with said rails and the upper ends of which are suitably connected with the rails 23, Figs. 4 and 5.

The framework for section D of the machine includes the uprights 26 and 27, disposed at opposite sides of the machine, said uprights being connected by suitable transverse tie members, shown in Fig. 6. The uprights at each side of the machine are connected by the upper and lower pairs of angle bars 28 and 29, respectively, as well as by the angle bars 30 and 31.

Extending between the uprights 12 and 27 are the upper and lower pairs of roller supporting rails 32 and 33, respectively, said rails having their ends suitably connected with said uprights, said ends also being suitably connected with the uprights 26. The framework of section D of the machine also includes a pair of uprights 34 connected by suitable transverse tie members. The uprights 34 are spaced from and connected with the uprights 27 by means of the upper and lower tie bars 35 and 36 which serve to support different parts of the tape severing mechanism, described hereinafter. It will be understood that the lower ends of the various upright frame members referred to above are rigidly secured upon or anchored to a suitable base such, for example, as a floor or other supporting means.

The blanks 5 when being advanced through section B of the machine, in which they are folded, are engaged at their bottom sides by a series of driven rolls 38, the opposite ends of which are journaled in the longitudinally extending beams 20 and 21 of the frame structure. Overlying the driven rolls are a series of rollers 39 and 39a, the opposite ends of which are journaled in the spaced rails 16 and 16a, said rollers having a limited vertical movement to permit them to rest upon and to accommodate themselves to the lower flight of the feed belt 40 for cooperation with the rolls 38 during advancement of the blanks discharged thereto by the feed mechanism designated generally by the reference numeral 41, Fig. 3, and described hereinafter.

The rollers 39a are provided with springs 39b which operate to urge them into engagement with the blanks 5 discharged beneath said rollers by the belt 40 whereby to insure continued movement of the blanks by the belt-driven rollers 38a at the left of the upright frame members 11, Fig. 5.

The belt 40 is supported upon suitably mounted pulleys 42 and is operated by a driving pulley 43 driven by a chain or belt 44 which in turn is driven by a worm wheel 45 operated by a worm 46 on a power driven shaft 47 which is operated by the gears 48 driven by suitable change speed gearing, not shown, within the casing 49, Figs. 1, 2, and 4. The shaft 47 is journaled in suitable bearings and is extended to and operatively connected with a change speed gear mechanism housed within a casing 50, said gearing being operatively connected with other parts of the mechanism, as described hereinafter.

A belt 51 driven by the shaft 47 is operatively connected with a relatively long shaft 52 which in turn is operatively connected with a series of vertically extending belts 53 individually connected with pulleys on and serving to drive the blank advancing rolls 38 and 38a, Figs. 1 and 2.

Any suitable means may be provided for feeding the blanks 5 from the stack or pile shown in Fig. 3 in spaced relation and between the belt 40 and the power driven rolls 38 for advancement through section B of the machine. The mechanism provided for this purpose, in the present instance, is shown more or less diagrammatically in Figs. 1 and 2, and also at the right of Fig. 3, and as previously stated is designated generally by the reference character 41. It comprises a frame having thereon a bed or table 54 and a member 55 inclined to the horizontal and receiving the leading edges of the blanks of the stack shown on said table, one in advance of another. A verically disposed guide plate 56 is superimposed upon the table and serves to maintain the blanks in proper alinement thereon and during movement therefrom.

A slide or pusher bar 57 is mounted for reciprocation upon the table and has its front edge extended beneath the pile of blanks, the slide being provided with a strip or raised portion 58 for successively engaging and advancing the blanks beneath the lower edge of the member 55 and between a pair of feed rolls 59 and 59a which serve to advance the blanks to and between the belt 40 and rollers 38 for advancement thereby. Reciprocation of the slide may be effected by any suitable means, such, for example, as the link 60 and lever 61, operated by another link 62 connected with a crank arm 63 fixed on a shaft 64 driven by a gear 65 which in turn is driven by a train of gears, one of which is operated by a transverse shaft 66, Fig. 3. A belt 67, Fig. 1, is operatively connected with the feed roll 59a, the belt having suitable driving means connected with and operated by the shaft 66. A pulley 68 is fixed on the shaft 66 and is driven by a belt 69 operated by a pulley 70 on a shaft 71 driven by a suitable change speed gearing within the casing 49. The gearing is driven by a shaft 72 having a pulley operated by a belt 73 connected with and driven by the shaft of an electric motor 74, Fig. 2.

In conditioning the blanks for the application of the tapes to the opposite edges of the folded ends thereof, it is highly desirable to prevent overlapping of said edges when completing the folding operations, and also to insure movement of said edges substantially into abutting relation in advance of the taping operations. This is particularly true of blanks constructed to afford boxes having the joint formed by uniting the ends of the blanks located at a point between two corners of the box and preferably nearer one corner than the other, as illustrated in Fig. 21. This results in having to fold a relatively narrow section of the blank and a relatively wide section, the latter embodying one complete side wall of the box and a portion of another side wall for cooperation with said relatively narrow section to complete an additional side wall. Obviously the wider the sections the greater the difficulties in folding the same to prevent overlapping of their opposing edge portions. However, one of the important features of the present invention embodies an improved method by which to avoid the overlapping of said edges and the consequent loss of the blanks that would have to be discarded by reason of the imperfect joints which would result from attempting to apply the tapes or connecting strips to said overlapping edges.

This method includes operating upon the scored blanks, preferably before folding the same, to inwardly offset an end portion on one foldable side wall of each blank which is to be joined with another foldable end portion for cooperation therewith to form the side wall having the joint therein, afforded by connecting said end portions. The method further includes folding the side wall having the inwardly offset end portion and the opposite foldable end portion downwardly over an intermediate section of the blank, positioning said end portions upon a horn or support, in spaced relation, and causing the free edge of said offset end portion to advance on the support substantially into abutting relation relative to the free edge of the opposite end portion as, for example, by exerting pressure downwardly on the foldable blank section having the offset end portion to straighten out said portion or to substantially realine it with the side wall from which it extends.

After thus positioning the opposing edges of said folded blank portions in substantially abutting relation, a further step in the conditioning of the blank for the reception of the tapes or connecting strips comprises employing suitable means for truing or squaring the blanks. By this is meant the overcoming of any inaccuracies resulting from the folding operations which may place the adjacent edges of the folded portions in divergent or non-parallel relation as indicated in a somewhat exaggerated manner in Fig. 25 of the drawings, which may occur in different blanks being advanced through the machine from time to time. In other words, the truing or squaring means serves to effect movement of one of the folded blank sections relative to another to position the adjacent edges of said end portions in substantially parallel relation, thus alining said sections as illustrated in Fig. 26 of the drawings.

The means for accomplishing this result will be described hereinafter, along with the blank folding means, together with the mechanism for continuing the advancement of the blanks and that for carrying out the method of taping the same and of severing of the tapes at points between the blanks, all of which mechanisms are constructed and coordinated to perform their respective functions in proper timed relation whereby to insure rapid and substantially continuous advancement of the blanks through the machine, and therefore economical production of the same.

It will be understood that when the blanks are advanced by the feeding means 41 to a point between the feed rolls 38 and the belt 40, that all portions thereof will lie in a single plane and that during their advancement toward the folding means the relatively narrow end portion 7a of each blank will be swung upwardly and offset inwardly by the means shown in Figs. 7, 13, and 14, to the angular position shown in Fig. 15. This means comprises a pin 75 on the longitudinally extending beam 20 having an upstanding member 76 clamped thereon for adjustment to different positions. The member 76 has a clamping block 77 adjustably secured upon its upper end and upon which is adjustably clamped an arm 78 of a rod 79 inclined to the horizontal and also inclined to the path of movement of the blanks to permit the end portions or extensions 7a of the blanks to ride upwardly thereon and to be forced inwardly thereby during advancement of the blanks, whereby to offset said extensions relative to the portion 6 of the blank, as indicated in Fig. 14.

Suitable means is also provided for holding the blank down in engagement with the rolls 38 at the time the extension 7a is being offset by the arm 79, whereby to insure accurate folding or hinging of the extension on the score line of the blank. This means comprises a rod 80 carried by an angularly offset arm 81 adjustably supported for movement laterally of the blank by a clamping bar 82, the lower end of which is clamped upon the horizontal portion 78 of the rod 79, Figs. 13 and 14. When the extension 7a of the blank passes the off-setting element 79 it will swing back to the desired angular relation with respect to the portions of the blank as indicated in Figs. 15 to 17, inclusive.

The initial folding operations of the advancing blanks are performed by a pair of rods 83 inclined to the horizontal as shown in Fig. 4, and which, as shown in Fig. 7 are disposed in convergent relation or inclined relative to the path of movement of the blanks in such a manner as to cause the extension 7 of the blank and the section 6 carrying the extension 7a to ride upon the rods and to be elevated thereby, as shown in Figs. 8 to 10, inclusive. The rods are more or less flexible and are preferably supported loosely at their outer ends by a transverse rod 83a, and have at their inner ends supporting lugs pivotally connected at 84a with brackets 85a secured upon the beams 20 and 21 of the frame structure, as shown in Figs. 7 and 11.

Additional rods 84 are provided for causing the foldable sections of the blanks to be moved inwardly and downwardly over the intermediate portions thereof when the blanks are being advanced to the position at which they are to be trued up or squared, as described hereinafter. The rods 84 are convergently arranged as shown in Fig. 11, and have adjustably clamped thereon, for a portion of their length, a plurality of blocks 85 each carrying a finger 86 adjustably held in position by a set screw 87 as illustrated in Fig. 15.

The outer ends of the rods 84 are provided with lugs pivotally connected at 84a with the brackets 85a, as are the lugs of the rods 83. The inner ends of the rods 84 are supported by the pivotally connected parts 86a and 87a, the latter being clamped upon the transverse shaft 88 for adjustment inwardly and outwardly thereon to vary the distance between the ends of said rods whereby to more accurately control the movements of the blank ends during completion of the folding operations, described hereinafter.

The shaft 88 is supported at its ends by a pair of arms 88a pivoted at 89 upon the frame members 20 and 21, said arms being flattened at their lower ends for the reception of the ends of the screws 89a adjustably supported by a pair of spaced brackets 90 and operable to vary the position of the arms to regulate the pressure of the rollers 91 on the folded sections of the blanks when in the position shown in Fig. 20.

In moving the foldable sections of the blanks down over the intermediate portions thereof while the blanks are traveling upon the driven rolls 38a, it is as previously stated, highly important to prevent overlapping of the edges of said foldable sections in order to avoid the difficulties that would obviously be encountered in attempting to apply the inner and outer tapes to the overlapped edges.

It is also extremely important to provide means for preventing the ends of the folded sections from contacting with the underlying gummed tape 8a prior to the positioning of the opposing edge portions of said ends in substantially abutting relation and also prior to truing or squaring-up the folded sections of the blanks.

The means for overcoming the above mentioned difficulties comprises a horn or supporting bar 92 extending longitudinally of the machine in overlying and protecting relation with respect to the tape 8a, the bar being supported by the parts 92a extending laterally from and carried by the arm 16c of the roll-supporting rail 16b, Figs. 11 and 19.

The tape 8a is unwound from a spool 93 and is carried over a glue applying roll 94 and then down around suitably supported rollers 93a and 94a and under the horn 92 as shown in Figs. 5, 11, and 19, the blank engaging rollers 39c being shortened as shown in Fig. 11 to afford clearance for the passage of the tape beneath the horn.

Before describing the manner of operating upon the folded sections of the blanks to position their ends in substantially abutting relation upon the horn, a description of the means for conveying the blanks from the feed rolls 38a to the point at which the truing operations are performed will be given. This means comprises relatively wide and narrow belts 95 and 96 which are spaced apart and disposed at opposite sides of the horn, as shown in Figs. 11 and 16. The belts are carried by front and rear pulleys 95a and 96a, respectively, mounted on suitably supported shafts 95b and 96b, the latter having a driving pulley 97 thereon operated by a belt 97a driven by a pulley on the shaft 52 for driving the belts 53 which operate the blank feed rolls 33a, Fig. 16. The upper flights of the belts are adapted to travel upon suitable supports 97b by which they are prevented from sagging as shown in Fig. 12, whereby to properly support the blanks during advancement by the belts. The horizontal or intermediate portion of the blank is maintained in proper engagement with the upper flight of the relatively wide belt 95 by a series of small rollers 98 on an arm 98a secured on the roller supporting rail 16a and in overlying relation with respect to the belt 95, as shown in Figs. 11, 12, and 16.

The blanks are discharged by the feed rolls 38a to the belts 95 and 96 which operate to advance the blanks at a speed greater than that at which they are moved by said feed rolls, with the result that the distance between the blanks is increased or made greater after they are received by the belts than when being advanced by the feed rolls 38a, as indicated in Fig. 19. By thus increasing the distance between the blanks, greater space is afforded therebetween for the operation of one element of the truing or squaring means described hereinafter, the other element of which includes means for momentarily arresting the blanks during advancement thereof by said belts, the arresting means including a transverse oscillatory shaft 99 having a plurality of lugs or abutments 99a normally depending in the path of the blanks and certain of which engage one of the folded ends of the blank and the other the opposite folded end, as shown in Figs. 12, 25, and 26, the construction and operation of the arresting means being further described hereinafter.

As previously stated, one of the foldable sections of the blank has thereon an inwardly offset extension 7a for connection with the opposite extension 7 of the blank, said extensions forming one side wall of the box when connected by the inner and outer securing strips 8 and 9, as shown in Fig. 21. Furthermore, as pointed out above the portions 7a are offset during advancement of the blanks by the belt 40 and feed rolls 38 before the blank folding operations are begun.

However during the continued advancement of the blanks the foldable sections are elevated by the rods 83, after which the operation of folding said sections inwardly and downwardly over the horizontal or intermediate portions of the blanks is effected by the rods 84 and the adjustable fingers 86 thereon which occupy different angular positions, ranging from the horizontal to the vertical, whereby they will successively engage the foldable sections of the advancing blanks and operate to gradually ease them downwardly to position their opposite edge portions in spaced relation upon the horn 92 while at the same time offering a minimum degree of frictional resistance to the advancement of the blanks by reason of the limited extent of contact therewith. Furthermore the flexibility of the rods is such as to cause them to readily vibrate during operation of the machine, whereby to increase their effectiveness as a blank folding means.

The spaced relation of the opposing edges of the blank extensions 7 and 7a, on the horn 92, as shown in Fig. 17 is due to the offsetting of the extension 7a. The horn also serves to steady the folded section having the extension thereon before depressing the section to move the free edge of its extension into engagement with that of the folded extension 7. However as advancement of the blank is continued said section will be depressed from the position shown in Fig. 17 to that shown in Fig. 18, during which time the edge of the offset portion will ride upon the inclined surface of the horn toward and substantially into abutting relation with respect to the opposing edge of the folded portion 7 of the blank, in which the portion 7a lies in the plane of the section from which it extends. It will be seen, therefore, that the offsetting of one section of the blank as shown in Fig. 17 and the straightening out of the offset portion in the manner described, overcomes the difficulties heretofore experienced with various machines of the present type in the overlapping of the ends of the blanks during the folding operations, and in fact positively insures against overlapping of these sections. While the present method of avoiding such difficulties is both simple and inexpensive, it nevertheless is highly effective and permits the desired results to be accomplished without interfering with the continuous and automatic method of folding and advancing the blanks. The portions of the horn which are adapted to receive the blank extensions 7 and 7a are preferably disposed in angular relation as shown in Figs. 16, 17 and 18 to correspond substantially to the inclination of the folded sections of the blank.

It will be understood that after the foldable sections have been moved to the position shown in Fig. 18 that they will be maintained in engagement with the horn by the rollers 91 on the shaft 88 when the blanks are being discharged from the horn and advanced by the belts 95 and 96 into engagement with the arresting means 99a, Figs. 5 and 12.

It will also be understood that the pressure of the rollers 91 on the folded sections of the blanks can be regulated or varied as desired by means of the adjustable screws 89a for shifting the pivotal arms 88a carrying the shaft 88 on which the rollers are mounted. Such adjustment can likewise be made to accommodate the rollers to blanks of different thicknesses which it may be desired to run through the machine from time to time.

The blank truing or squaring means, as previously stated, includes a transverse shaft 99 having depending lugs or stops 99a for momentarily arresting the blanks at the position indicated in Fig. 19, to which the blanks are moved by the speeding up operations of the belts 95 and 96. The truing or squaring operations take place while the leading edges of the blanks are in engagement with the arresting means, and at the time when the squaring element 100 is moved into engagement with the trailing edges of the folded blank sections to aline the latter by moving one relative to another from the position shown in Fig. 25 to that shown in Fig. 26. The squaring element is notched as shown in Fig. 16 to clear the horn 92 and the tape 8a extending beneath the horn. The squaring element is pivotally mounted on a pair of vertically disposed plate members 101 suitably connected with and supported by a bracket 102 adjustably mounted on a pair of reciprocating rods 103 carried by suitable guides 104 supported by the frame as indicated in Figs. 5 and 19.

The squaring element has a vertically disposed arm 105 by which it is normally held in the elevated position shown in Fig. 19 by a spring 106 inclined to the horizontal as shown in Fig. 5 and having its lower end connected with a fixed member 106a located beneath the frame of the machine. The arm 105 is normally held by the spring in engagement with a stop 107 on one of the plate members 101 whereby the squaring element is held in said elevated position during its advancement toward and into engagement with the blank. It will be apparent, however, that on the return stroke of the squaring element it will be necessary to depress or lower said element to prevent it from interfering with the movement of the next succeeding blank being advanced by the belts 95 and 96. This is accomplished by a second spring 108 having one end connected with the bracket 102, Fig. 16, and the other with the squaring element at a point in advance of its pivotal support 109, Figs. 22 and 24. However, the spring 108 will not operate to depress the squaring element until the latter has reached the end of its operating stroke, as shown in Fig. 22, at which position the tension of the spring 106 will be considerably reduced by reason of the shortening of the distance between its ends. In this position of the parts the spring 108 will overcome the resistance offered by the spring 106, thus causing the squaring element to be lowered at or about the time it begins its return stroke, the squaring element being retained in lowered position with the arm 105 in engagement with stop 107a until the tension of the spring 106 is sufficient to overcome that of the spring 108, which may be at or about the time the squaring element reaches the end of its return stroke, whereby it will be moved upwardly into operating position between the advancing blanks, as shown in Fig. 19.

Reciprocation of the squaring element is effected in proper timed relation by the operation of the lever 61 for operating the blank advancing slide 57, Fig. 3. The lever has connected therewith a link 110 which in turn is connected with a lever 111 from which extends a connection 112 to a second lever 113, the latter having a connection 114 extending to and pivotally connected with a cross-head 115 to which the rods 103 are attached, as indicated in Figs. 1, 3, and 5.

The shaft 99 of the blank arresting means is provided with a torsion spring 99b, Fig. 27, which yieldingly resists the pressure exerted by the blank on the stops 99a of the shaft when the squaring element 100 is moved into engagement with the trailing edges of the folded sections of the blank, as shown in Fig. 26. It will be understood, however, that upon continued advancement of the squaring element, the stops will be displaced by the blank and the resistance of the spring increased by a partial rotation of the shaft as the blank is being advanced beneath the stops and between the upper and lower feed belts 116 and 117 into engagement with the next preceding blank, as shown in Fig. 22, in which the squaring element is at the end of its operating stroke. The upper feed belts are spaced apart as shown in Fig. 27 and are supported by pulleys 118 on a vertically adjustable shaft 119 while the single lower belt 117 is supported by a pulley 120 on a relatively short shaft 121, Figs. 19 and 27. The shaft 121 has its ends journaled in suitable bearings carried by the brackets 121a on the transverse frame members 121b as shown in Figs. 27 and 28. The shaft 121 has a cam 122 fixed on one end thereof which, at every revolution of the shaft, engages a roller on an arm 123 fixed on the shaft 99 carrying the blank arresting stops or lugs 99a. The cam, at each revolution, will operate the arm 123 to move it from the position shown in Fig. 28 to that shown in Fig. 29, in which the stop lugs will be held out of frictional engagement with the blank whereby to avoid any tendency of the lugs to retard the movement of the blanks by the squaring element.

It will be understood, however, that the operations of the cam are so timed that the arm 123 will be released to permit the shaft 99 and stop lugs thereon to be returned to normal position in time to arrest each of the blanks successively advanced by the squaring element to the position shown in Fig. 22, which is that to which the blanks are moved each into engagement with the next preceding blank.

The shaft carrying the blank arresting lugs has a laterally projecting part 99c thereon, Fig. 27, which is adapted to engage a bumper 121c on a bracket carried by one of the transverse frame members 121b, as shown in Fig. 28, whereby the blank arresting lugs are held in proper position to be contacted by the blanks during movement thereof by the squaring element.

While the blanks are being advanced by the belts 95 and 96 and the truing element 100 into position between the feed belts 116 and 117, it is desirable to have means opposite the belt 95 and in alinement therewith for supporting the blanks until said feed belts have had time to grip and advance the blanks in the direction of the tape severing means described hereinafter. The means provided for the purpose stated comprises a transversely extending plate 124 suitably connected with and supported by the framework of the machine, as shown in Fig. 27, and a transversely extending roller 125 supported by brackets 126 on the transverse frame members 121b, Figs. 11 and 27.

The belt supporting pulleys 118 and 120 are made adjustable one relative to another in a vertical direction to provide for what may be conveniently termed a V-shaped "throat" between the upper and lower flights of the belts 116 and 117, as indicated at 127 in Figs. 19 and 22, whereby to provide sufficient clearance between the belts to avoid undue frictional resistance to advancement of the blanks, one into engagement with another by the truing element 100. Furthermore by providing means for vertically adjusting one of the pulleys relative to another such, for example, as the pulleys 118, blanks of different thicknesses can be readily accommodated by the belts. To this end the shaft 119 is journaled in the oppositely disposed bearings 128 mounted between adjustable guides 129 and movable on the vertically disposed supporting plates 130 attached to the upright frame members 12 as shown in Figs. 5 and 27. The bearings 128 are provided with feed screws 131 guided by suitable brackets 132, the screws each having a beveled pinion 133 threaded thereon and each pinion meshing with a similar pinion 134 fixed on a transverse shaft 135 adapted to be operated by a hand wheel 136 to raise or lower the bearings and the shaft carried thereby, as may be desired. The pinions 133 are seated on bearing blocks 137 carried by the brackets and are held in position upon the blocks by springs 138 operating at all times to urge the bearings in a downward direction.

The upper flight at the lower belt 117 is supported by and adapted to travel on a series of rollers 139, the opposite ends of which are supported by the longitudinally extending beams or rails 33 which are connected with and supported by the upright frame members 12 and 27, as are the overlying rails 32. Extending between and supported by the rails 32 are a series of rollers 140 which engage the lower flights of the upper belts 116 to maintain them in contact with the blanks during advancement thereof to the tape severing mechanism.

A plurality of the upper rollers 140 are preferably made to yieldingly engage the lower flights of the upper belts 116 by means of suitable springs 141 whereby to increase the friction between the belts and the blanks to insure advancement of the latter, the first of the rollers being placed at the end of the V-shaped "throat" 127 to cause the belts to frictionally engage the blanks, successively moved one into engagement with the other by the squaring element 100, shown at the end of its operating stroke in Fig. 22.

The lower belt 117 is supported by a pulley 142 on a shaft 219 and also by a pulley 143 and is operated by a driving pulley 144, as shown in Fig. 6. The upper belt 116 is supported by pulleys 145 and 146 and operated by a driving pulley 147, also shown in Fig. 6, the pulley 145 being mounted on a transverse shaft 145a. The driving pulley 144 is mounted on a shaft 148 driven by a worm wheel 149 operated by a worm 150 on a driven shaft 151 which in turn is operated by a chain 50a driven by suitable gearing housed within the change speed gear box 50, Figs. 1 and 2.

The driving pulley 147 for the feed belt 116 is mounted on a shaft 152 having a sprocket driven by a belt 153 operated by a sprocket on the shaft 148 which operates the driven pulley 144 of the lower feed belt 117, Fig. 6.

The tape 9a for application to the outer faces of the adjacent edges of the blank extensions 7 and 7a is unwound from a supply roll 154 and carried around the glue applying roll 155 and thence over a roller 156 and around a flanged roll 157 on the shaft 119 carrying the supporting pulleys 118 for the upper feed belts 116, Figs. 22 and 27. As shown in Figs. 11 and 22 the outer gummed tape 9a, upon leaving the roll 157 passes under the first of the rollers 140 and over and in engagement with the blanks, to the adjacent edges of which the tape is applied by a member 158 yieldingly pressed into engagement with the tape by a pivoted member 159 having a bolt or rod 160 extending upwardly therefrom through a support 161, the rod having thereon a spring 162 for yieldingly maintaining the member 158 in engagement with the advancing tape to firmly press it into engagement with the blanks and to iron out and smooth the tape while advancing, it being understood that it is desired to use a number of the tape applying devices between the blank squaring and severing mechanisms to insure proper application of the tape to the blanks. It will be further understood that pressure of the tape applying members 158, on the blanks, will insure proper application of the inner tape 8a to the adjacent edges of the blank extensions 7 and 7a.

The tape severing mechanism is shown in Figs. 6, and 30 to 36, inclusive, and is disposed adjacent the point of discharge of the blanks by the upper and lower feed belts 116 and 117, respectively. When discharging from the feed belts the blanks are advanced over a pair of rollers 163 spaced on a transverse shaft 164 as shown in Fig. 31, to permit the rotary tape severing knife 165 to operate between the rollers at each revolution to sever the tapes at points between the blanks successively advanced by the feed belts, the knife being operated as described hereinafter. The knife is detachably connected with an arm 166 fixed on a shaft 167 supported by the spaced brackets 168 which are suitably connected with the longitudinally extending frame members 35, Figs. 30 and 31.

Before the tape severing operations take place to effect separation of one blank from another, the blanks will be successively advanced into engagement with a series of relatively narrow belts 169 spaced apart, as shown in Fig. 2, said belts being supported by pulleys 170 and 171 on transverse shafts 170a and 171a, respectively, the shafts being supported by suitable bearings carried by the framework of the machine. The upper flights of the belts 169 are prevented from sagging by an underlying table 172 connected with and supported by the longitudinally extending frame members 36, Fig. 30. The blanks when being advanced upon the belts 169 are passed beneath a feed roll 173 driven by means described hereinafter, said roll cooperating with said belts to speed up the blanks which are moved beneath a second feed roll 174 on an arm 175 pivoted at 176 on a supporting head or bracket 177 and having a spring 178 connected therewith for yieldingly maintaining the feed roll in engagement with the blanks to insure advancement thereof through frictional engagement with the belt.

The separated blanks successively advanced by the belts 169 are moved beneath an additional roll 179 before being discharged by said belts to a roller table, not shown, or other suitable means for conveying the blanks to their destination. The belts 169 are driven at a greater rate of speed than the belts 116 and 117 whereby to increase the speed of the blanks in order to make use of the same as a means for controlling the operations of the clutch for actuating the knife for severing the tapes as described hereinafter.

The knife operating shaft 167 has a clutch on one end thereof which includes the disks 180 and 181, and the friction driving plate 182 located between the disks. The disk 180 is fixed on the shaft while the disk 181 is free to rotate thereon under the pressure exerted by the member 183 and spring 184, Figs. 31 and 32. The disk 181 is constantly driven by a sprocket 185 and chain 186, driven by a sprocket 187 carried by a shaft 188, said shaft having thereon a sprocket 189 driven by a chain 190 supported by sprockets 191 and 192, the latter being on the shaft 152 which is driven by the belt 153, all as indicated in Fig. 6.

The disk 180 of the shaft 167 has a tooth or lug 181a normally engaged by a lever 193 pivoted on the bracket 168 and connected with a link 194 which in turn is connected with an arm 194a on one end of a transverse shaft 195. The opposite end of the shaft has thereon an arm 195a which is connected with a link 196 having its lower end connected with an arm 197 fixed on and extending laterally from a rock shaft 198 extending longitudinally of the machine and having its opposite ends journaled in bearings 198b, the latter being supported by a vertically disposed plate 199 depending from one of the frame members 35, Figs. 30 and 34.

A spring 200 is connected with the arm 197 and operates on the link 196 and the parts connecting it with the lever 193 to hold the free end of the latter in engagement with the lug 181a of the disk 180 to prevent operation of the latter by the rotating member of the clutch and the consequent operation of the tape severing knife until the shaft 198 is rocked by the tripping means controlled by the movement of the blanks, as described hereinafter.

Secured on the head 177 are spaced bearings 201 and 201a through which the rock shaft 198 extends. Fixed on the shaft between the bearings is an arm 202 slotted at one side to receive a detent 203 depending from the arm and pivoted thereon at its upper end. The detent 203 for rocking the shaft 198 is yieldingly held in outward position, as shown in Fig. 36, by a spring 204 disposed within a recess formed within the arm 202.

A dog or tripping element 205 normally extends in the path of the blanks in position to be engaged and operated by the leading edges of the blanks to effect operation of the detent whereby to rock the shaft 198 to operate the connections between the shaft and the clutch controlling lever 193 for the purpose of moving the lever to release the knife operating element of the clutch before the blank reaches the position at which the knife will operate to sever the tapes, or in other words, to the tripping position shown in Fig. 30.

The dog 205 is mounted to swing on a bolt 206 carried by the head 177 and has an offset portion 207 provided with a lug 208 for engaging the lower end of the detent 203 when the dog is swung by the blank from the position shown in Fig. 30 to that shown in Fig. 34, at which time the detent will be pushed up to rock the shaft 198 as previously stated. Upon return of the dog from the position shown in Fig. 34 to that shown in Figs. 30 and 36, the part 207 of the dog will engage and move past the detent, at the same time swinging it inwardly to a position at which it will be cleared by the part 207 to permit the spring 204 to return the detent to normal position over the operating lug 208 of the dog. Return of the dog to normal position is effected at the moment the advancing blank passes from beneath the same, the return being effected by a torsion spring 209 on the bolt 206, one end of the spring being secured on the head of the bolt and the other engaging the part 207 of the dog, as shown in Fig. 35.

A screw 210 threaded in a lug 211 on the head 177 serves as an adjustable stop for engaging a lug 212 on the dog to limit its movement when the dog is being returned to normal position by the spring 209. It will be understood that the clutch control lever 193, after being moved to clear the lug 181a on the clutch disk 180 will, through the operation of the spring 200, be returned to engagement with the periphery of the disk in time to be engaged by said lug upon completion of each revolution of the disk.

It will also be understood that each advancing blank serves to release the clutch for operating the knife in proper timed relation to cause it to sever the tapes at a point between said blank and the next succeeding blank advanced by the belts 116 and 117, and that the blanks separated by the severing of the tapes will be advanced by the belts 169 through cooperation with the feed rolls 173 and 174 and at such a rate of speed as to clear the tripping element 205 in time for it to move into position to be operated by each succeeding blank.

Means is provided for moving the head 177 longitudinally of the machine to accommodate the blank-operated clutch releasing element 205 thereon to blanks of varying widths which it may be desired to run through the machine from time to time. To this end the head 177 is slidably mounted on a suitably supported guide rod 213, the head being also guided by the rock shaft 198 by reason of the fact that the lugs 201 and 201a of the head are slidably mounted on said shaft, the latter having a longitudinally extending groove 198a for receiving the key 199a of the rocker arm 202 to permit the latter to slide on the rod and to be operatively associated therewith in any position to which the head 177 may be moved.

Adjustment of the head on the rod 213 and shaft 198 is effected by a feed screw 214 threadedly engaging the head and arranged to be operated by a hand wheel 215. The extent of adjustment of the head on said rod and shaft may be readily determined by a scale 216 and index member 217 on the head. For example, as shown in Figs. 30 and 34, the head is so adjusted that the tripping element 205 is set to accommodate it, for example, to a 20" blank. If however it is desired to operate upon 24" blanks, the feed screw 214 will be turned until the index member is opposite the 24" mark on the scale.

Operation of the series of belts 169 for discharging the blanks from the machine to a suitable conveyor, not shown, is afforded by providing a sprocket 216 on the shaft 171a carrying the driving pulleys 171 for the belts 169 and driving said sprocket by means of a chain 217 driven by a sprocket 218 loosely mounted on the shaft 219, the sprocket 218 having a driving sprocket 220 formed integral therewith, as shown in Fig. 31. The driving sprocket 220 is driven by a chain 221 operated by a sprocket 222 fixed on and driven by the shaft 148 for driving the pulley 144 to operate the feed belt 117, as previously described. The chain 217 serves to drive the blank feed roll 173 overlying the pulley 170 of the belts 169, Fig. 6. Operation of the feed roll is effected by means of a sprocket 223 on the feed roll shaft driven by a chain 224 operated by a sprocket 225 which is driven by an adjacent sprocket 226 operated by the chain 217, as shown in Fig. 6.

In the operation of the machine, the blanks of the stack placed on the table 54 are successively advanced by the pusher bar 57 between the feed rolls 59 and 59a, which operate to discharge the blanks to the feed rolls 38 and belt 40 for advancement thereby. Before the folding operations are begun the extension or end portion 7a of each blank will be offset by the upwardly and inwardly inclined rod 79, so that said extension will be angularly disposed with respect to the section of the blank from which it extends and thus conditioned to avoid overlapping of the foldable sections of the blanks when they are subsequently swung downwardly over the intermediate portion of the blank.

During continued advancement of the blanks the foldable sections will first be swung upwardly by the rods 83 to the position shown in Fig. 10, after which the rods 84 will begin to swing said sections inwardly and downwardly, which operations will be continued by the fingers 86 on the rods until the ends of the folded sections are moved into engagement with the horn 92 with their opposing edge portions in spaced relation as shown in Fig. 17. However the blanks by this time will have reached the belts 95 and 96 which operate to speed up the blanks and to advance them into engagement with the arresting means 99a, as shown in Figs. 12 and 25. During the advancement of the blanks by the belts 95 and 96 toward the arresting means the folded section having the offset extension 7a will be moved by the fingers 86 on the inner ends of the rods 84 and also by the rollers 91 on the shaft 88 downwardly from the position shown in Fig. 17 to that shown in Figs. 18 and 20. During these operations the offset portion 7a of each blank will move on the horn 92 substantially into abutting relation with respect to the opposing edge of the folded section 7, the offset extension 7a thus becoming realined with the folded section 6 from which it extends, as shown in Fig. 20.

Immediately after each blank is moved into engagement with the arresting means, the reciprocating truing element 100 will engage the trailing edges of the folded sections of the blank to effect squaring of the blank by properly alining said sections or, in other words, by moving one relative to another from the position shown in Fig. 25 to that shown in Fig. 26, this operation being performed before the blank is discharged from the horn 92.

As soon as the blank has been trued or squared in the manner described, the cam 122 on the driven shaft 121 will engage the roller on the arm 123 of the shaft 99 whereby to swing the stop lugs 99a out of the path of the blanks, or from the position shown in Fig. 28 to that shown in Fig. 29. Thereafter, upon passage of the blank beneath and past the stop lugs, the cam 122 will release the arm 123 of the shaft 99 to permit the latter and the stop lugs thereon to be returned to normal operating position by the tension of the spring 99b. However during the operations just described the truing element 100 will have advanced the blank into engagement with the next preceding blank between the feed belts 116 and 117, as indicated in Fig. 22, it being understood that continued advancement of the blanks will be afforded by the feed belts 116 and 117.

During continued advancement of the blanks by the feed belts, the inner and outer tapes 8a and 9a are applied to the adjacent edges of the folded sections of the blanks, the inner tape being carried under the horn 92 and protected thereby from contacting with the foldable sections of the blanks when they are swung downwardly into position upon the horn.

Both the inner and outer tapes are applied to the opposite faces of the opposing edges of the blanks by the pressure exerted by the parts 158 of the yieldingly mounted members 159 shown in Fig. 22, said parts serving also as a means for ironing or smoothing the tape during advancement by the blanks.

The blanks are discharged by the feed belts 116 and 117 to the tape severing mechanism, at which time the blanks are successively advanced between the belts 169 and the feed roll 173 into engagement with the clutch tripping element 205 which operates through the detent 203 to rock the shaft 198, whereby to operate the connections for moving the clutch controlled lever 193 from engagement with the lug 181a of the clutch disk 180 to release the latter for operation by the constantly driven clutch disk 181.

The tape severing knife 165 will then be rotated to sever the inner and outer tapes between the adjacent edges of the blanks during continued advancement of the latter, the knife being arrested at the end of each revolution by the re-engagement of the lug on the disk 180 with the control lever 193, which is immediately returned by the operation of the spring 200 into engagement with the periphery of the disk 180 upon release of the latter by the lever.

It will be understood that the blanks separated by the tape severing operations will be speeded up by the belts 169 to clear the tripping dog 205 in time for it to return to normal position for operation by each succeeding blank discharged by the feed belts 116 and 117.

The separated blanks, during advancement by the belts 169, are frictionally held in engagement with the belts by the feed rolls 173 and 174, the latter of which is spring-pressed and operates to hold the blanks in engagement with the belts until they have passed beneath the roller 179 while being discharged to a roller table or other suitable conveying means, not shown.

We claim:

1. A machine for operating upon box forming blanks, comprising mechanism for advancing the blanks in spaced relation, means for folding the blanks during advancement thereof, mechanism for advancing the blanks in contact one with another subsequent to the folding operations, means located between said mechanisms for squaring the blanks including a device for moving the squared blanks to the second advancing mechanism and in contact one with another, and means for applying connecting means to the opposing edge portions of the blanks during advancement of the blanks in contact one with another.

2. A machine for operating upon box forming blanks, comprising mechanism for advancing the blanks in spaced relation, means for folding the blanks during advancement thereof, a second mechanism for advancing the blanks in contact one with another, means operating between said mechanisms to square the blanks including a device adapted to successively engage the trailing edges of the blanks and to move the blanks to said second mechanism in contact one with another, and means for applying connecting means to the opposing edge portions of the folded sections of the blanks during advancement of the blanks by said second mechanism.

3. A machine for operating upon box forming blanks, comprising mechanism for advancing the blanks, means for folding the blanks during advancement thereof to position opposing edge portions of the blanks in substantially abutting relation, a second mechanism for advancing the blanks, means operating to square the blanks subsequent to the folding operations and in advance of their movement by said second mechanism, and means for applying connecting means to the opposing edge portions of the folded sections of the blanks during advancement thereof by said second mechanism.

4. A machine for operating upon box forming blanks, comprising mechanism for advancing the blanks, means for folding the blanks during advancement thereof, a second mechanism for advancing the blanks, means operating to arrest and square the blanks subsequent to the folding operations, said means including a device for moving the squared blanks to said second mechanism for advancement thereby, and means for applying connecting means to the opposing edge portions of the folded sections of the blanks during advancement of the blanks by said second mechanism.

5. A machine for operating upon box forming blanks having foldable sections, comprising mechanism for advancing the blanks, means for offsetting an end portion of one of the foldable sections of each blank during advancement of the blanks, supporting means, means for folding said blank sections to position the opposing edge portions thereof in spaced relation on the supporting means, said folding means operating to straighten out said offset end portion to cause its edge portion to move on said supporting means substantially into abutting relation with respect to the edge portion of the opposite folded section of the blank, means for continuing advancement of the blanks, and means for applying connecting means to said edge portions during continued advancement of the blanks.

6. A machine for operating upon box forming blanks, comprising means for advancing the blanks in spaced relation, means for advancing the blanks in contact one with another, means for folding the blanks during advancement by said first means to position opposite edge portions of the blanks in adjacent relation, means for truing and moving the folded blanks into position to be advanced in contact one with another by said second mentioned means, means for applying a connecting strip to said edge portions during advancement of the blanks by the second means, and means for severing the strip at points between the blanks.

7. A machine for operating upon box forming blanks, comprising means for advancing the blanks in spaced relation, means for advancing the blanks in contact one with another, means for folding the blanks during advancement by said first means to position opposite edge portions of the blanks in adjacent relation, means for truing and moving the folded blanks into position to be advanced in contact one with another by said second mentioned means, means for applying separate connecting strips to said edge portions at opposite sides of the blanks during advancement of the blanks by said second means, and means for severing the strips at points between the blanks during advancement of the blanks.

8. A machine for operating upon box forming blanks, comprising means for successively advancing the blanks in spaced relation and to a predetermined position, means for subsequently advancing the blanks in contact one with another, means for folding the blanks during advancement by said first means to position opposite edge portions of the blanks in adjacent relation, means for arresting and truing the blanks at said predetermined position, said last mentioned means comprising relatively movable devices one of which is operable subsequent to the truing operations to successively move the blanks each into engagement with the next preceding blank and into position to be advanced by the second means, and means for applying connecting means to said edge portions of the blanks.

9. A machine for operating upon box forming blanks, comprising means for successively advancing the blanks in spaced relation and to a predetermined position, means for subsequently advancing the blanks in contact one with another, means for folding the blanks during advancement by said first means to position opposite edge portions of the blanks in adjacent relation, means for arresting and truing the blanks at said predetermined position, said last mentioned means comprising relatively movable devices one of which is operable subsequent to the truing operations to successively move the blanks each into engagement with the next preceding blank and into position to be advanced by the second means, and means for applying a connecting strip to said adjacent edge portions during advancement of the blanks by the second mentioned means.

10. A machine for operating upon box forming blanks, comprising means for advancing the blanks in spaced relation, means for advancing the blanks in contact one with another, means for folding the blanks during advancement by said first means to position opposite edge portions of the blanks in adjacent relation, means for truing and moving the folded blanks into position to be advanced in contact one with another by the second mentioned means, means for applying a connecting strip to said adjacent edge portions of the blanks during advancement of the blanks by the second means, means for severing the strip at points between the blanks during advancement of the blanks including intermittently operable driving means, and control means for releasing the driving means for operation, said control means being operated by each of the advancing blanks in a predetermined position thereof.

11. A machine for operating upon box forming blanks, comprising mechanism for advancing the blanks, a second mechanism for advancing the blanks, means for folding the blanks during advancement by said first mechanism to position opposite edge portions of the blanks in adjacent relation, means interposed between said mechanisms for successively moving each blank to an advanced position relative to the next succeeding blank, mechanism for truing the advanced blanks at said position including means for successively moving the trued blanks into position to be advanced by the second mentioned mechanism, and means for applying connecting means to the adjacent edge portions of the blanks advanced by the second mentioned mechanism.

12. A machine for operating upon box forming blanks, comprising mechanism for advancing the blanks, a second mechanism for advancing the blanks, means for folding the blanks during advancement by said first mechanism to position opposite edge portions of the blanks in adjacent relation, means interposed between said mechanisms for successively moving each blank to an advanced position relative to the next succeeding blank, mechanism for truing the advanced blanks at said position including means for successively moving the trued blanks into position to be advanced by the second mentioned mechanism, and means for applying connecting means to said edge portions during advancement of the blanks by the second mentioned mechanism.

13. A machine for operating upon box forming blanks, comprising mechanism for advancing the blanks, a second mechanism for advancing the blanks, means for folding the blanks during advancement by said first mechanism to position opposite edge portions of the blanks in adjacent relation, means interposed between said mechanisms for successively moving each blank to an advanced position relative to the next succeeding blank, mechanism for truing the advanced blanks at said position including reciprocating means for successively moving the trued blanks into position to be advanced by the second mentioned mechanism, means for applying a connecting strip to said edge portions during advancement of the blanks by the second mentioned mechanism, and means for severing the strip at points between the blanks.

14. A machine for operating upon box forming blanks, comprising mechanism for advancing the blanks, a second mechanism for advancing the blanks, means for folding the blanks during advancement by said first mechanism to position opposite edge portions of the blanks in adjacent relation, means interposed between said mechanisms for successively increasing the speed of each blank to move it to an advanced position relative to the next succeeding blank, mechanism for truing the advanced blanks including means for successively moving the trued blanks into position to be advanced by the second mentioned mechanism, and means for applying connecting means to the adjacent edge portions of the blanks advanced by the second mentioned mechanism.

15. A machine for operating upon box forming blanks, comprising mechanism for advancing the blanks, a second mechanism for advancing the blanks, means for folding the blanks during advancement by said first mechanism to position opposite edge portions of the blanks in adjacent relation, means interposed between said mechanisms for successively moving each blank to an advanced position relative to the next succeeding blank, means for arresting the advanced blanks at said position, positioning means cooperating with the arresting means to effect truing of the blanks at said advanced position, said positioning means being operable to successively move the trued blanks into position to be advanced by the second mentioned mechanism, and means for applying connecting means to the adjacent edge portions of the blanks advanced by the second mentioned mechanism.

16. A machine for operating upon box forming blanks, comprising mechanism for advancing the blanks, a second mechanism for advancing the blanks, means for folding the blanks during advancement by said first mechanism to position opposite edge portions of the blanks in adjacent relation, means interposed between said mechanisms for successively moving each blank to an advanced position relative to the next succeeding blank, means for arresting the advanced blanks at said position, positioning means cooperating with the arresting means to effect truing of the blanks at said advanced position, said positioning means being operable to successively move the trued blanks into position to be advanced by the second mentioned mechanism, actuating means for moving the arresting means from operating to non-operative position following each blank truing operation, and means for applying connecting means to the adjacent edge portions of the blanks advanced by the second mentioned mechanism.

17. A machine for operating upon box forming blanks, comprising mechanism for advancing the blanks, a second mechanism for advancing the blanks, means for folding the blanks during advancement by said first mechanism to position opposite edge portions of the blanks in adjacent relation, means interposed between said mechanisms for successively moving each blank to an advanced position relative to the next succeeding blank, means for arresting the advanced blanks at said position, positioning means cooperating with the arresting means to effect truing of the blanks at said advanced position, said positioning means being operable to successively move the trued blanks into position to be advanced by the second mentioned mechanism, actuating means for moving the arresting means from operating to non-operating position following each blank truing operation, means for applying a connecting strip to said edge portions of the blanks at one side thereof during advancement of the blanks by the second mentioned mechanism, means for severing the strip at points between the blanks during advancement of the latter including intermittently operable driving means, and control means for releasing the driving means for operation, said control means being operated by each of the advancing blanks in a predetermined position thereof.

18. A machine for operating upon box forming blanks, comprising means for feeding the blanks in spaced relation, mechanism for advancing the spaced blanks, means for folding the blanks during advancement by said mechanism to position opposite edge portions of the blanks in adjacent relation, a second mechanism for advancing the blanks in contact one with another, means interposed between said mechanisms for truing and moving the folded blanks into position to be advanced in contact one with another by the second mentioned mechanism, means for applying a connecting strip to said adjacent edge portions of the blanks at one side thereof during advancement of the blanks by the second mechanism, means for severing the strip at points between the advancing blanks, and means for successively advancing the blanks from the severing means in spaced relation one to another.

19. A machine for operating upon box forming blanks, comprising mechanism for advancing the blanks, means for feeding the blanks in spaced relation to said mechanism, a second mechanism for advancing the blanks in contact one with another, means for folding the blanks during advancement by said first mechanism to position opposite edge portions of the blanks in adjacent relation, means interposed between said mechanisms for successively moving each blank to an advanced position relative to the next succeeding blank, means for arresting the advanced blanks at said position, positioning means cooperating with the arresting means to effect truing of the blanks at said advanced position, said positioning means being operable to successively move the trued blanks into position to be advanced in contact one with another by the second mentioned mechanism, actuating means for moving the arresting means from operating to non-operating position following each blank truing operation, means for applying a connecting strip to said edge portions of the blanks at one side thereof during advancement of the blanks by the second mentioned mechanism, means for severing the strip at points between the blanks during advancement of the latter including intermittently operable driving means, control means for releasing the driving means for operation, said control means being operated by each of the advancing blanks in a predetermined position thereof, and means for successively advancing the blanks from the severing means in spaced relation one to another.

20. In a machine for operating upon box forming blanks having opposite extensions on opposing side walls thereof, supporting means for the blank, means for offsetting the end portion of the extension of one of the side walls to position it in angular relation relative to the remaining portion of said extension, a part for receiving the opposing free edge portions of said extensions, and means for operating upon the blank to position said edge portions in spaced relation on said part and to effect movement of the last mentioned side wall in a direction to cause the free edge of the offset portion of its extension to ride on said part toward and substantially into abutting relation relative to the corresponding edge portion of the opposite extension.

21. In a machine for operating upon box forming blanks having opposite extensions on opposing side walls thereof, supporting means for the blank, means for offsetting the end portion of the extension of one of the side walls to position it in angular relation relative to the remaining portion of said extension, a part for receiving the opposing free edge portions of said extensions, means for operating upon the blank to position said edge portions in spaced relation on said part and to effect movement of the last mentioned side wall in a direction to cause the free edge of the offset portion of its extension to ride on said part toward and substantially into abutting relation relative to the corresponding edge portion of the opposite extension, and means for applying connecting means to said edge portions to unite one with another.

22. In a machine for operating upon box forming blanks having opposite extensions on opposing side walls thereof, supporting means for the blank, means for offsetting the end portion of the extension of one of the side walls to position it in angular relation relative to the remaining portion of said extension, a part for receiving the opposing free edge portions of said extensions, means for operating upon the blank to position said edge portions in spaced relation on said part and to effect movement of the last mentioned side wall in a direction to cause the free edge of the offset portion of its extension to ride on said part toward and substantially into abutting relation relative to the corresponding edge portion of the opposite extension, means for truing the blank, and means for applying connecting means to said edge portions.

23. In a machine for operating upon box forming blanks having opposite extensions on opposing side walls thereof, supporting means for the blank, means for offsetting the end portion of the extension of one of the side walls to position it in angular relation relative to the remaining portion of said extension, a part for receiving the opposing free edge portions of said extensions, means for operating upon the blank to position said edge portions in spaced relation on said part and to effect movement of the last mentioned side wall to cause the free edge of the offset portion of its extension to ride on said part toward the corresponding edge portion of the opposite extension, and means for applying to a gummed strip said edge portions.

24. In a machine for operating upon box forming blanks having opposite extensions on opposing side walls thereof, supporting means for the blank, means for offsetting the end portion of the extension of one of the side walls to position it in angular relation relative to the remaining portion of said extension, a part for receiving the opposing free edge portions of said extensions, means for operating upon the blank to position said edge portions in spaced relation on said part and to effect movement of the last mentioned side wall to cause the free edge of the offset portion of its extension to ride on said part toward the corresponding edge portion of the opposite extension, means for subsequently advancing the blank, and means for applying connecting means to said edge portions during advancement of the blank.

25. In a machine for operating upon box forming blanks having opposite extensions on opposing side walls thereof, supporting means for the blank, means for offsetting the end portion of the extension of one of the side walls to position it in angular relation relative to the remaining portion of said extension, a part for receiving the opposing free edge portions of said extensions, means for operating upon the blank to position said edge portions in spaced relation on said part and to effect movement of the last mentioned side wall to cause the free edge of the offset portion of its extension to ride on said part toward the corresponding edge portion of the opposite extension, means for truing the blank, means for subsequently advancing the blank, and means for applying connecting means to said edge portions during advancement of the blank.

26. In a machine for operating upon box forming blanks having opposite extensions on opposing side walls thereof, supporting means for the blank, a part overlying an intermediate portion of the blank, means for offsetting the end portion of the extension of one of the side walls of the blank to position it in angular relation relative to the remaining portion of said extension, devices for folding the last mentioned side wall and its extension and the opposite extension down over the intermediate portion of the blank with the opposing free edge portions of said extensions in spaced relation on said part, one of said devices operating to press down the folded wall having the offset extension to aline said extension including its offset portion with said wall and to cause its free edge portion to move on said part substantially into abutting relation relative to the free edge portion of the opposite extension, and means for applying connecting means to said edge portions.

27. In a machine for operating upon box forming blanks having opposite extensions on opposing side walls thereof, supporting means for the blank, a part overlying an intermediate portion of the blank, means for offsetting the end portion of the extension of one of the side walls of the blank to position it in angular relation relative to the remaining portion of said extension, devices for folding the last mentioned side wall and its extension and the opposite extension down over the intermediate portion of the blank with the opposing free edge portions of said extensions in spaced relation on said part, one of said devices operating to press down the folded wall having the offset extension to aline said extension including its offset portion with said wall and to cause its free edge portion to move on said part substantially into abutting relation relative to the free edge portion of the opposite extension, means for truing the blank at a predetermined position, means for advancing the blank from said position, and means for applying connecting means to said edge portions during advancement of the blank.

28. In a machine for operating upon box forming blanks having opposite extensions on opposing side walls thereof, supporting means for the blank, a part overlying an intermediate portion of the blank, means for offsetting the end portion of the extension of one of the side walls of the blank to position it in angular relation relative to the remaining portion of said extension, devices for folding the last mentioned side wall and its extension and the opposite extension down over the intermediate portion of the blank with the opposing free edge portions of said extensions in spaced relation on said part, one of said devices operating to press down the folded wall having the offset extension to aline said extension including its offset portion with said wall and to cause its free edge portion to move on said part substantially into abutting relation relative to the free edge portion of the opposite extension, means for truing the blank at a predetermined position, means for advancing the blank from said position, and means for applying gummed strips to said edge portions at opposite sides of the blank extensions during advancement of the blank.

29. A machine for operating upon box forming blanks having opposite extensions on opposing side walls thereof, means for advancing the blanks, a supporting element mounted adjacent the advancing means, means for inwardly offsetting the end portion of the extension of one of the side walls of each blank during advancement of the blanks, devices for folding the blanks during advancement thereof to position the opposing free edge portions of the extensions on said supporting element in spaced relation, one of said devices operating to press down the wall having the offset extension to aline said extension including its offset portion with said wall and to cause its free edge portion to move on said element substantially into abutting relation relative to the free edge portion of the opposite extension, and means for applying connecting means to the edge portions of the extensions during advancement of the blanks.

30. A machine for operating upon box forming blanks having opposite extensions on opposing side walls thereof, means for advancing the blanks, a supporting element mounted adjacent the advancing means, means for inwardly offsetting the end portion of the extension of one of the side walls of each blank during advancement of the blanks, devices for folding the blanks during advancement thereof to position the opposing free edge portions of the extensions on said supporting element in spaced relation, one of said devices operating to press down the wall having the offset extension to aline said extension including its offset portion with said wall and to cause its free edge portion to move on said element substantially into abutting relation relative to the free edge portion of the opposite extension, means for truing the blanks, and means for applying connecting means to the edge portions of the extensions during advancement of the blanks.

31. A machine for operating upon box forming blanks having opposite extensions on opposing side walls thereof, means for advancing the blanks, a supporting element mounted adjacent the advancing means, means for inwardly offsetting the end portion of the extension of one of the side walls of each blank during advancement of the blanks, devices for folding the blanks during advancement thereof to position the opposing free edge portions of the extensions on said supporting element in spaced relation, one of said devices operating to press down the wall having the offset extension to aline said extension including its offset portion with said wall and to cause its free edge portion to move on said element substantially into abutting relation relative to the free edge portion of the opposite extension, means for truing the blanks, means for applying a connecting strip to said edge portions during advancement of the blanks, and means for severing the strip at points between the blanks during advancement of the blanks.

32. A machine for operating upon box forming blanks having opposite extensions on opposing side walls thereof, mechanism for successively advancing the blanks in spaced relation, a supporting element mounted adjacent said mechanism, means for inwardly offsetting the end portion of the extension of one of the side walls of each blank during advancement of the blanks by said mechanism, devices for folding the blanks during advancement thereof to position the opposing free edge portions of the extensions on said supporting element in spaced relation, one of said devices operating to press down the wall having the offset extension to aline said extension including its offset portion with said wall and to cause its free edge portion to move on said element substantially into abutting relation relative to the free edge portion of the opposite extension, a second mechanism for advancing the blanks in contact one with another, means interposed between said advancing mechanisms for truing and conveying the folded blanks from said first mechanism into position to be advanced in contact one with another by the second mechanism, means for applying a connecting strip to said edge portions during advancement of the blanks in contact one with another by the second mechanism, and means for severing the strips at points between the advancing blanks.

33. A machine for operating upon box forming blanks, comprising means for feeding the blanks in spaced relation, mechanism for advancing the spaced blanks, means for folding the blanks during advancement by said mechanism to position opposite edge portions of the blanks in adjacent relation, a second mechanism for advancing the blanks in contact one with another, means interposed between said mechanisms for truing and moving the folded blanks into position to be advanced in contact one with another by the second mentioned mechanism, means for applying a connecting strip to said adjacent edge portions of the blanks at one side thereof during advancement of the blanks by the second mechanism, means for severing the strip at points between the blanks during advancement thereof, mechanism for successively advancing the blanks from the severing means in spaced relation one to another, and mechanism for actuating said feeding means, said advancing mechanisms, the blank truing and moving means, and the severing means in timed relation.

34. A machine for operating upon box forming blanks, comprising mechanism for advancing the blanks in spaced relation, means for folding the blanks during advancement thereof to position opposite edge portions of the blanks in adjacent relation, a second mechanism for advancing the blanks in contact one with another comprising upper and lower belts and supporting pulleys therefor, two of the pulleys operating to support the belts at the point of entrance of the blanks between the belts, means supporting one of said pulleys for adjustment toward and from the other to vary the distance between the cooperating flights of the belts at and slightly in advance of said point, operating devices associated with one of said mechanisms for truing the blanks, one of said devices being operable subsequent to the truing operation to advance each blank into position between said belts to contact with the next preceding blank being advanced thereby, and means for applying connecting means to the opposite edge portions of said blanks during advancement of the blanks by said belts.

35. A machine for operating upon box forming blanks, comprising mechanism for advancing the blanks in spaced relation, means for folding the blanks during advancement thereof to position opposite edge portions of the blanks in adjacent relation, a second mechanism for advancing the blanks in contact one with another comprising upper and lower belts and supporting pulleys therefor, two of the pulleys operating to support the belts at the point of entrance of the blanks between the belts, means supporting one of said pulleys for adjustment toward and from the other to vary the distance between the cooperating flights of the belts at and slightly in advance of said point, operating devices associated with one of said mechanisms for truing the blanks, one of said devices being operable subsequent to the truing operation to advance each blank into position between said belts to contact with the next preceding blank being advanced thereby, and means for applying a connecting strip to said edge portions during advancement of the blanks by said belts.

36. A machine for operating upon box forming blanks, comprising mechanism for advancing the blanks in spaced relation, means for folding the blanks during advancement thereof to position opposite edge portions of the blanks in adjacent relation, a second mechanism for advancing the blanks in contact one with another comprising upper and lower belts and supporting pulleys therefor, two of the pulleys operating to support the belts at the point of entrance of the blanks between the belts, means supporting one of said pulleys for adjustment toward and from the other to vary the distance between the cooperating flights of the belts at and slightly in advance of said point, means spaced from said last mentioned pulleys for yieldingly urging one of said belt flights toward another, operating devices associated with one of said mechanisms for truing the blanks, one of said devices being operable subsequent to the truing operation to advance each blank into position between said belts to contact with the next preceding blank being advanced thereby, means for applying a connecting strip to said edge portions during advancement of the blanks by said belts, and means for severing the strip at points between the blanks during advancement of the blanks.

37. A machine for operating upon box forming blanks, comprising mechanism for advancing the blanks in spaced relation, means for folding the blanks during advancement thereof to position opposite edge portions of the blanks in adjacent relation, a second mechanism for advancing the blanks in contact one with another comprising upper and lower belts and supporting pulleys therefor, two of the pulleys operating to support the belts at the point of entrance of the blanks between the belts, means supporting one of said pulleys for adjustment toward and from the other to vary the distance between the cooperating flights of the belts at and slightly in advance of said point, blank arresting means mounted adjacent said point, conveying means in position to receive the blanks from said first advancing mechanism, said means being operable to accelerate the movement of the blanks, to increase the distance between the same and to successively position the blanks in contact with said arresting means, a device for cooperation with said arresting means to effect truing of the blanks, said device being operable subsequent to the truing operations to advance each blank into position between said belts to contact with the next preceding blank being advanced thereby, and means for applying a connecting strip to said edge portions during advancement of the blanks by said belts.

38. A machine for operating upon box forming blanks comprising mechanism for advancing the blanks in spaced relation, means for folding the blanks during advancement thereof to position opposite edge portions of the blanks in adjacent relation, a second mechanism for advancing the blanks in contact one with another comprising upper and lower belts and supporting pulleys therefor, two of the pulleys operating to support the blank receiving portions of the belts in convergent relation to provide a substantially V-shaped entrance for the blanks between said portions, means for adjustably supporting one of the last mentioned pulleys to vary the degree of convergence between said portions, means spaced from said last mentioned pulleys for yieldingly urging the blank advancing flight of one of the belts toward another, means interposed between said blank advancing mechanisms for receiving the blanks from said first mechanism, said means operating to successively advance each blank into said entrance and in position to contact with the next preceding blank being advanced by the belts, and means for applying a connecting strip to said edge portions during advancement of the blanks.

39. A machine for operating upon box forming blanks, comprising mechanism for advancing the blanks in spaced relation, means for folding the blanks during advancement thereof to position the opposing edge portions of the folded sections of the blanks in adjacent relation, a second mechanism for advancing the blanks in contact one with another comprising a lower belt and a pair of spaced upper belts and supporting pulleys for said belts, the pulleys for supporting the blank receiving portions of the upper belts being mounted for adjustment in a vertical direction, means for effecting vertical adjustment of said pulleys to provide a substantially V-shaped entrance for the blanks between the upper and lower belts, means adjacent the inner end of said entrance for yieldingly urging the lower flights of said upper belts in the direction of the lower belt, means for arresting the blanks advanced by said first mechanism, a device cooperating with said arresting means to square the blanks, said device operating to successively advance each squared blank into said entrance with its adjacent edge portions between said upper belts, said device also operating to move each of the blanks in contact with the next preceding blank for advancement by said upper and lower belts and means operating between said belts to apply a connecting strip to said edge portions during advancement of the blanks.

40. A machine for operating upon box forming blanks, comprising means for successively advancing the blanks in spaced relation and to a predetermined position, means for subsequently advancing the blanks while in contact one with another, means for folding the blanks during advancement by said first means to position opposite edge portions of the blanks in adjacent relation, means for arresting the blanks at said predetermined position, mechanism for cooperation with said arresting means to effect truing of the blanks at said position and for successively advancing with blanks from said position each into contact with the next preceding blank, said mechanism including a reciprocally mounted device provided with a movable blank engaging and advancing member having control elements, one for retaining said member in operating position during advancement of said device and another for moving said member on said device to an inoperative position beneath the plane of movement of the blanks upon completion of the advancing stroke of said device, and means for reciprocating said device.

41. In a machine for operating upon box forming blanks, mechanism for folding and successively advancing the blanks in spaced relation to a predetermined position, means for arresting the blanks at said position, a reciprocally mounted device for cooperation with said arresting means to effect truing of the blanks at said position and for moving the blanks from said position subsequent to the truing operations, and means for reciprocating said device.

42. In a machine for operating upon box forming blanks, mechanism for folding and successively advancing the blanks in spaced relation and to a predetermined position, means for arresting the blanks at said position, a reciprocally mounted device, a member movable on said device and operating when it is moved in one direction to cooperate with said arresting means to effect truing of the blanks and movement of the blanks in advance of said position, means for holding said member in operating position during movement of said device in said last mentioned direction, means for moving said member on said device to non-operating position subsequent to each truing operation, and means for reciprocating said device.

43. In a machine for operating upon box forming blanks, mechanism for folding and successively advancing the blanks in spaced relation and to a predetermined position, means for arresting the blanks at said position, a reciprocally mounted device, a member mounted on said device for movement into and out of the path of movement of the blanks, resilient means for holding said member in said path of movement and in position to engage the blanks when said device is being moved in one direction whereby to cooperate with said arresting means to effect truing of the blanks, said member subsequently operating to move the blanks from said position upon continued movement of said device in said direction, means for moving said member on said device out of the path of movement of the blanks and subsequent to each truing operation, and means for reciprocating said device.

44. In a machine for operating upon box forming blanks, mechanism for successively moving the blanks in spaced relation and to a predetermined position preparatory to moving them to an advanced position, a reciprocally mounted device, a member mounted on said device for movement into and out of the path of movement of the blanks and operable to successively engage and move the blanks from said predetermined position into engagement one with another at said advanced position when said device is moved in one direction, cooperating parts for moving said member into and out of the path of movement of the blanks at predetermined points between the limits of movement of said device, and means for reciprocating said device in timed relation to the operation of said blank moving mechanism.

45. A machine for operating upon box forming blanks, comprising means for successively advancing the blanks in spaced relation and to a predetermined position, means for subsequently advancing the blanks in contact one with another, means for folding the blanks during advancement by said first means to position opposite edge portions of the blanks in adjacent relation, means for moving the folded blanks from said position into contact one with another and in position to be advanced by said second means, and means for applying connecting means to said edge portions during advancement of the blanks by said second means.

46. A machine for operating upon box forming blanks, comprising means for successively advancing the blanks in spaced relation and to a predetermined position, means for folding the blanks during advancement to said position, means for truing the blanks at said position including a blank advancing element, a second blank advancing mechanism to which the blanks are moved by said element each in contact with the next preceding blank, and means for effecting application of a connecting strip to said edge portions during advancement of the blanks in contact one with another.

47. A machine for operating upon box forming blanks, comprising mechanism for advancing the blanks, means for feeding the blanks to said advancing mechanism, a supporting element substantially paralleling the direction of movement of the blanks, means for folding the blanks during advancement thereof to position the opposing edge portions of the ends of the blanks in substantially abutting relation upon said supporting element, a second blank advancing mechanism, means for moving the blanks from said first mechanism to said second mechanism, means for supporting a strip for advancement beneath said supporting element, and means for effecting application of the strip to the inner faces of said edge portions during advancement of the blanks by said second mechanism.

48. A machine for operating upon box forming blanks, comprising mechanism for advancing the blanks, means for feeding the blanks to said advancing mechanism, a supporting element substantially paralleling the direction of movement of the blanks, means for folding the blanks during advancement thereof to position the opposing edge portions of the ends of the blanks in substantially abutting relation upon said supporting element, a second blank advancing mechanism, means for moving the blanks from said first mechanism to said second mechanism, means for supporting inner and outer strips for advancement beneath and above said supporting element respectively, and means for effecting application of said inner and outer strips to the inner and outer faces of said edge portions during advancement of the blanks by said second mechanism.

49. A machine for operating upon box forming blanks, comprising mechanism for advancing the blanks, a supporting element substantially paralleling the direction of movement of the blanks, means for folding the blanks during advancement thereof to position the opposing edge portions of the ends of the blanks in adjacent relation upon said supporting element, a second blank advancing mechanism, means for squaring the folded blanks including an element for moving the squared blanks to said second advancing mechanism, means for supporting a strip for advancement beneath said supporting element, and means for effecting application of the strip to the inner faces of said opposing edge portions during advancement of the blanks by said second mechanism.

50. A machine for operating upon box forming blanks, comprising mechanism for advancing the blanks, a supporting element substantially paralleling the direction of movement of the blanks, means for folding the blanks during advancement thereof to position the opposing edge portions of the ends of the blanks in adjacent relation upon said supporting element, a second blank advancing mechanism, means for squaring the folded blanks including an element for moving the squared blanks to said second advancing mechanism, means for supporting inner and outer strips for advancement and above said supporting element respectively, and means for effecting application of said strips to the inner and outer faces of said edge portions during advancement of the blanks by said second mechanism.

51. A machine for operating upon box forming blanks, comprising mechanism for advancing the blanks to a predetermined position, means for arresting the blanks at said position, means for folding the blanks during advancement thereof, a second mechanism for advancing the blanks, a device for cooperating with said arresting means to effect truing of the blanks, said device subsequently operating to move the blanks to said second advancing mechanism, and means for applying connecting means to the opposing edge portions of the folded sections of the blanks during advancement of the blanks by said second mechanism.

52. A machine for operating upon box forming blanks, comprising mechanism for advancing the blanks in spaced relation and to a predetermined position, means for folding the blanks during advancement thereof, a second blank advancing mechanism, a support having stops thereon for arresting the blanks at said position, means for cooperating with said stops to effect truing of the blanks, said means being subsequently operable to move the trued blanks to said second mechanism for advancement thereby, means for operating said support to elevate said stops subsequent to the truing of each blank to permit passage of the blanks beneath the stops, means for returning the support and stops to normal blank arresting position in advance of each truing operation, means for applying connecting means to the opposing edges of the folded sections of the blanks during advancement of the blanks by said second mechanism.

53. A machine for operating upon box forming blanks, comprising mechanism for advancing the blanks, means for folding the blanks during advancement thereof including oppositely disposed rods for engaging and moving the foldable sections of the blanks inwardly and downwardly over the intermediate portions thereof to position the opposing edge portions of said sections in adjacent relation, a second blank advancing mechanism, blank arresting means located between said advancing mechanisms, means for moving the blanks in spaced relation from said first advancing mechanism to said arresting means, a device movable for cooperation with the arresting means to effect squaring of the blanks and movement of the same from squaring position to the second advancing mechanism, and means for applying connecting means to the opposing edge portions of the folded sections of the blanks during advancement of the blanks by said second mechanism.

54. A machine for operating upon box forming blanks, comprising mechanism for advancing the blanks, means for folding the blanks during advancement thereof including oppositely disposed supporting elements each having a plurality of spaced members thereon disposed in angular relation one relative to another for successively engaging the foldable sections of the advancing blanks to move them downwardly over the intermediate portions of the blanks to position the opposing edge portions of said sections in adjacent relation, means for continuing advancement of the blanks, and means for applying connecting means to said edge portions of the blanks during continued advancement of the blanks.

55. A machine for operating upon box forming blanks, comprising mechanism for advancing the blanks, means for folding the blanks during advancement to position opposite edge portions thereof in adjacent relation, means for applying a strip to said edge portions subsequent to the folding operations and during advancement of the blanks, and means actuated by the advancing edges of the blanks for severing the strip at points between the blanks during advancement thereof.

56. A machine for operating upon box forming blanks, comprising mechanism for advancing the blanks, means for folding the blanks during advancement to position opposite edge portions thereof in adjacent relation, means for applying the strip to said edge portions during advancement of a connecting blank, a knife for severing the strip at points between the blanks, a clutch releasable for operation to effect operation of the knife, and means for releasing the clutch, said means being operated successively by the advancing blanks.

57. A machine for operating upon box forming blanks, comprising mechanism for advancing the blanks, means for folding the blanks during advancement to position opposite edge portions thereof in adjacent relation, means for applying a connecting strip to said edge portions during advancement of the blanks, a knife for severing the strip at points between the blanks, a clutch releasable for operation to effect operation of the knife, means for releasing the clutch, said means being operated successively by the advancing blanks, and means for discharging the blanks separated by the strip severing operations at a speed greater than that at which the blanks are moved by said advancing mechanism.

58. A machine for operating upon box forming blanks, comprising mechanism for advancing the blanks, means for folding the blanks during advancement to position opposite edge portions thereof in adjacent relation, means for applying a connecting strip to said edge portions subsequent to the folding operations and during advancement of the blanks, a knife for severing the strip at points between the advancing blanks, a clutch releasable for operation to effect operation of the knife, means for releasing the clutch including a tripping element adapted to be operated by each advancing blank, said tripping element having means for returning it to normal position, and means for speeding up the blanks freed by the strip severing operations to permit the tripping element to return to normal position in time to be operated by each succeeding blank in advance of the strip severing operation corresponding to said blank.

59. A machine for operating upon box forming blanks, comprising mechanism for advancing the blanks, means for folding the blanks during advancement to position opposite edge portions thereof in adjacent relation, means for applying a connecting strip to said edge portions subsequent to the folding operations and during advancement of the blanks, a knife for severing the strip at points between the advancing blanks, a clutch releasable for operation to effect operation of the knife, means for releasing the clutch including a tripping element adapted to be operated by each advancing blank, said tripping element having means for returning it to normal position, means for speeding up the blanks freed by the strip severing operations to permit the tripping element to return to normal position in time to be operated by each succeeding blank in advance of the strip severing operation corresponding to said blank, an adjustable supporting member for the tripping element, and means for adjusting said member to accommodate the tripping element to blanks of different widths.

60. A machine for operating upon box forming blanks, comprising mechanism for advancing the blanks, means for folding the blanks during advancement to position opposite edge portions thereof in adjacent relation, means for applying a connecting strip to said edge portions subsequent to the folding operations and during advancement of the blanks, a knife for severing the strip at points between the blanks, a clutch releasable for operation to effect operation of the knife, means for releasing the clutch including an oscillatory shaft, a support slidably mounted on said shaft, a tripping element pivoted on the support and adapted for operation by each advancing blank, means responsive to the movement of the tripping element by the blank for operating said shaft to effect release of the clutch, means for returning the shaft to normal position upon release of the clutch, means for speeding up the blanks freed by the strip severing operations to permit the tripping element to return to normal position in time to be operated by each succeeding blank in advance of the strip severing operation corresponding to said blank, means for adjusting said support to accommodate the tripping element to blanks of different widths, an index on said support, and a scale associated with the index for indicating the extent of adjustment of the support.

61. The method of connecting the ends of box forming blanks, comprising offsetting an end portion of one of the foldable sections of the blank, folding said sections inwardly and downwardly over the intermediate portion of the blank to position the edge of said offset end portion and that of the opposite end portion in spaced relation, pressing down the section having the offset end portion to straighten out said offset portion and to cause its edge to move substantially into abutting relation with respect to the edge of the opposite folded section, and applying connecting means to said edge portions to unite said folded sections.

62. The method of connecting the ends of box forming blanks, comprising advancing the blanks and at the same time offsetting an end portion of one of the foldable sections of each blank, continuing the advancement of the blanks and swinging the foldable sections inwardly and downwardly over the intermediate portions of the blanks, employing means to receive and support the edge of each offset end portion and that of the opposite end portion in spaced relation, pressing down the section having the offset end portion to straighten out said offset portion and to cause its edge to move on the supporting means substantially into abutting relation with respect to the edge of the opposite folded section, and applying a connecting strip to said edge portions to unite said folded sections.

63. The method of joining opposite extensions on opposing side walls of a box forming blank to form one side wall having a joint between opposite corners of the box, comprising inwardly offsetting the extension of one of the side walls, folding the last mentioned side wall and its extension and the other of said extensions down over an intermediate portion of the blank, pressing down the folded side wall having the offset extension to straighten out said extension whereby to advance its outer edge portion substantially into abutting relation relative to the corresponding edge portion of the other extension, and uniting said edge portions by applying connecting means thereto.

64. The method of joining opposite extensions on opposing side walls of a box forming blank to form one side wall having a joint between opposite corners of the box, comprising inwardly offsetting the extension of one of the side walls, folding the last mentioned side wall and its extension and the other of said extensions down over an intermediate portion of the blank, pressing down the folded side wall having the offset extension to straighten out said extension whereby to advance its outer edge portion substantially into abutting relation relative to the corresponding edge portion of the other extension, and uniting said edge portions by placing an adhesively coated strip thereon and pressing said edge portions and said strip together.

65. The method of joining opposite extensions on opposing side walls of a box forming blank to form one side wall having a joint between opposite corners of the box, comprising inwardly offsetting the extension of one of the side walls, folding the last mentioned side wall and its extension and the other of said extensions down over an intermediate portion of the blank, employing means to receive and support the opposing edge portions of said extensions in spaced relation over the intermediate portion of the blank, pressing down the folded side wall having the offset extension whereby to cause the edge portion of said extension to ride on said means into substantially abutting relation relative to the corresponding edge portion of the other extension, and subsequently uniting said extensions by applying connecting means to the edge portions thereof.

66. The method of joining opposite extensions on opposing side walls of a box forming blank to form one side wall having a joint between opposite corners of the box, comprising inwardly offsetting the extension of one of the side walls, folding the last mentioned side wall and its extension and the other of said extensions down over an intermediate portion of the blank, employing means to receive and support the opposing edge portions of said extensions in spaced relation over the intermediate portion of the blank, pressing down the folded side wall having the offset extension whereby to cause the edge portion of said extension to ride on said means into substantially abutting relation relative to the corresponding edge portion of the other extension, advancing the blank and at the same time advancing a strip between said edge portions and the intermediate portion of the blank, and applying the strip to said edge portions by the use of adhesive material to unite said edge portions one with another.

67. The method of joining opposite extensions on opposing side walls of a box forming blank to form one side wall having a joint between opposite corners of the box, comprising inwardly offsetting the extension of one of the side walls, folding the last mentioned side wall and its extension and the other of said extensions down over an intermediate portion of the blank, employing means to receive and support the opposing edge portions of said extensions in spaced relation over the intermediate portion of the blank, pressing down the folded side wall having the offset extension whereby to cause the edge portion of said extension to ride on said means into substantially abutting relation relative to the corresponding edge portion of the other extension, advancing the blank and at the same time advancing inner and outer connecting strips for said edge portions at opposite sides thereof, and applying said strips to said edge portions by the use of adhesive material while advancing the strips and the blanks.

68. The method of connecting foldable sections of a box forming blank, one of which sections has an offset end portion, comprising folding said sections inwardly and downwardly over the intermediate portion of the blank to position the edge of said offset end portion and that of the opposite folded section in spaced relation, pressing down the section having the offset end portion to straighten out said offset portion and to cause its edge to move substantially into abutting relation with respect to the edge of the opposite folded section, and applying connecting means to said edge portions to unite said folded sections.

69. A machine for making containers from foldable blanks, comprising continuously operated blank advancing means, means for folding the blanks during advancement to position the opposing end portions thereof in adjacent relation over the intermediate portions of the blanks, means for arresting and squaring the folded blanks during continued operation of the advancing means, said advancing means operating to continue advancement of the blanks subsequent to the operation of the squaring means, and devices for effecting application of securing means to the opposing end portions of each blank to connect said end portions one with another.

70. A machine for making containers from foldable blanks, comprising continuously operated blank advancing means, means for folding the blanks during advancement to position the opposing end portions thereof in adjacent relation over the intermediate portions of the blanks, mechanism for arresting and squaring the blanks during continued operation of the advancing means, said mechanism including a device for moving each squared blank subsequent to the squaring operations into engagement with the next preceding squared blank, movement of the squared blanks being continued in contact one with another by a part of the advancing means, and means for effecting application of securing means to the opposing end portions of the squared blanks to connect said end portions during advancement of the blanks.

71. A machine for operating upon box forming blanks, comprising means for advancing the blanks in spaced relation, means for folding the blanks during advancement thereof, means for advancing the blanks in contact one with another subsequent to the folding operations, and means for applying a connecting strip to said edge portions during advancement of the blanks in contact one with another.

72. In a machine for operating upon a box forming blank having opposite extensions on opposing side walls thereof one of which extensions has an angularly disposed end portion, a supporting element adapted to overlie an intermediate portion of the blank and to receive the opposing free edge portions of said extensions, and means for operating upon the extensions to position said edge portions in spaced relation on said supporting element and to effect movement of the extension having the angularly disposed end portion to cause the free edge of said end portion to ride on said supporting element toward and into adjacent relation relative to the corresponding free edge of the opposite extension.

73. In a machine for operating upon a box forming blank having opposite extensions on opposing side walls thereof one of which extensions has an angularly disposed end portion, a supporting element adapted to overlie an intermediate portion of the blank and to receive the opposing free edge portions of said extensions, means for operating upon the extensions to position said edge portions in spaced relation on said supporting element and to effect movement of the extension having the angularly disposed end portion to cause the free edge of said end portion to ride on said supporting element toward and into adjacent relation relative to the corresponding free edge of the opposite extension, and means for applying connecting means to said edge portions to unite one with another.

74. In a machine for operating upon a box forming blank having opposite extensions on opposing side walls thereof one of which extensions has an angularly disposed end portion, a supporting element adapted to overlie an intermediate portion of the blank and to receive the opposing free edge portions of said extensions, means for operating upon the extensions to position said edge portions in spaced relation on said supporting element and to effect movement of the extension having the angularly disposed end portion to cause the free edge of said end portion to ride on said supporting element toward and into adjacent relation relative to the corresponding free edge of the opposite extension, means for truing the blank, and means for applying a connecting strip to said edge portions to unite one with the other.

75. In a machine for operating upon a box forming blank having opposite extensions on opposing side walls thereof one of which extensions has an angularly disposed end portion, means for advancing the blank, a supporting element adapted to overlie an intermediate portion of the blank during advancement thereof, means operating during advancement of the blank to fold said extensions about said supporting element and to position the opposing free edge portions thereof in spaced relation on said supporting element and to effect movement of the extension having the angularly disposed end portion to cause the free edge of said end portion to ride on said supporting element toward and into adjacent relation relative to the corresponding free edge of the opposite extension, and means for applying connecting means to said edge portions.

76. In a machine for operating upon a box forming blank having opposite extensions on opposing side walls thereof one of which extensions has an angularly disposed end portion, means for advancing the blank, a supporting element adapted to overlie an intermediate portion of the blank during advancement thereof, means operating during advancement of the blank to fold said extensions about said supporting element and to position the opposing free edge portions thereof in spaced relation on said supporting element and to effect movement of the extension having the angularly disposed end portion to cause the free edge of said end portion to ride on said supporting element toward and into adjacent relation relative to the corresponding free edge of the opposite extension, means for truing the blanks, and means for applying connecting means to said edge portions to unite one with another.

77. A machine for operating upon box forming blanks having opposite extensions on opposing side walls thereof, one of the extensions of each blank having an angularly disposed end portion, means for advancing the blanks, a supporting element adapted to overlie intermediate portions of the blanks during advancement thereof, devices for folding the extensions of the blanks during advancement of the blanks to position the opposing free edge portions of the extensions on the supporting element in spaced relation, one of said devices operating to press down the extensions having the angularly disposed end portions to cause the free edges of said end portions to ride on said supporting element toward and into adjacent relation relative to the corresponding free edge portions of the opposite extensions, and means for applying connecting means to said edge portions to unite one with another.

78. A machine for operating upon box forming blanks having opposite extensions on opposing side walls thereof, one of the extensions of each blank having an angularly disposed end portion, means for advancing the blanks, a supporting element adapted to overlie intermediate portions of the blanks during advancement thereof, devices for folding the extensions of the blanks during advancement of the blanks to position the opposing free edge portions of the extensions on the supporting element in spaced relation, one of said devices operating to press down the extensions having the angularly disposed end portions to cause the free edges of said end portions to ride on said supporting element toward and into adjacent relation relative to the corresponding free edge portions of the opposite extensions, means for truing the blanks at a predetermined position to which they are moved by the advancing means, and means for applying connecting means to the adjacent edge portions of the blanks during continued advancement thereof.

79. In a machine for making containers from blanks having intermediate portions with foldable sections at opposite sides thereof, one of the foldable sections of each blank having an offset end portion, means for advancing the blanks, a member in position to overlie the intermediate portions of the blanks during advancement of the blanks, devices for folding the opposite sections of the blanks down over the intermediate portions thereof to position the opposing edges of said sections in spaced relation on said member, the device for folding the sections having the offset portions including means operating upon said sections during advancement of the blanks to straighten out said offset portions whereby to move the edges thereof on said member substantially into abutting relation with respect to the corresponding edges of the opposite folded sections, and means for applying connecting means to the opposing edges of the folded sections to unite said sections one with another.

WILBER E. BOWERSOCK.
FRANCIS J. SPIESS.

CERTIFICATE OF CORRECTION.

Patent No. 2,068,163.　　　　　　　　　　　　　　　　January 19, 1937.

WILBER E. BOWERSOCK, ET AL.

It is hereby certified that error appears in the printed specification of the above numbered patent requiring correction as follows: Page 17, second column, line 8, claim 56, for the article "the" read a connecting; and line 9, same claim, for "a connecting blank" read the blanks; and that the said Letters Patent should be read with these corrections therein that the same may conform to the record of the case in the Patent Office.

Signed and sealed this 23rd day of March, A. D. 1937.

(Seal)　　　　　　　　　　　　　　　　　　　　Henry Van Arsdale
　　　　　　　　　　　　　　　　　　　Acting Commissioner of Patents.

portions of the blanks during advancement thereof, devices for folding the extensions of the blanks during advancement of the blanks to position the opposing free edge portions of the extensions on the supporting element in spaced relation, one of said devices operating to press down the extensions having the angularly disposed end portions to cause the free edges of said end portions to ride on said supporting element toward and into adjacent relation relative to the corresponding free edge portions of the opposite extensions, and means for applying connecting means to said edge portions to unite one with another.

78. A machine for operating upon box forming blanks having opposite extensions on opposing side walls thereof, one of the extensions of each blank having an angularly disposed end portion, means for advancing the blanks, a supporting element adapted to overlie intermediate portions of the blanks during advancement thereof, devices for folding the extensions of the blanks during advancement of the blanks to position the opposing free edge portions of the extensions on the supporting element in spaced relation, one of said devices operating to press down the extensions having the angularly disposed end portions to cause the free edges of said end portions to ride on said supporting element toward and into adjacent relation relative to the corresponding free edge portions of the opposite extensions, means for truing the blanks at a predetermined position to which they are moved by the advancing means, and means for applying connecting means to the adjacent edge portions of the blanks during continued advancement thereof.

79. In a machine for making containers from blanks having intermediate portions with foldable sections at opposite sides thereof, one of the foldable sections of each blank having an offset end portion, means for advancing the blanks, a member in position to overlie the intermediate portions of the blanks during advancement of the blanks, devices for folding the opposite sections of the blanks down over the intermediate portions thereof to position the opposing edges of said sections in spaced relation on said member, the device for folding the sections having the offset portions including means operating upon said sections during advancement of the blanks to straighten out said offset portions whereby to move the edges thereof on said member substantially into abutting relation with respect to the corresponding edges of the opposite folded sections, and means for applying connecting means to the opposing edges of the folded sections to unite said sections one with another.

WILBER E. BOWERSOCK.
FRANCIS J. SPIESS.

CERTIFICATE OF CORRECTION.

Patent No. 2,068,163. January 19, 1937.

WILBER E. BOWERSOCK, ET AL.

It is hereby certified that error appears in the printed specification of the above numbered patent requiring correction as follows: Page 17, second column, line 8, claim 56, for the article "the" read a connecting; and line 9, same claim, for "a connecting blank" read the blanks; and that the said Letters Patent should be read with these corrections therein that the same may conform to the record of the case in the Patent Office.

Signed and sealed this 23rd day of March, A. D. 1937.

(Seal)

Henry Van Arsdale
Acting Commissioner of Patents.

CERTIFICATE OF CORRECTION.

Patent No. 2,068,163.                                                              January 19, 193

WILBER E. BOWERSOCK, ET AL.

It is hereby certified that error appears in the printed specification o the above numbered patent requiring correction as follows: Page 17, second column, line 8, claim 56, for the article "the" read a connecting; and line 9, same claim, for "a connecting blank" read the blanks; and that the said Letters Patent should be read with these corrections therein that the same may conform to the record of the case in the Patent Office.

Signed and sealed this 23rd day of March, A. D. 1937.

(Seal)

Henry Van Arsdale
Acting Commissioner of Patents.